(12) United States Patent
Gmelch et al.

(10) Patent No.: US 11,859,115 B2
(45) Date of Patent: Jan. 2, 2024

(54) METHOD FOR ACTIVATING AND DEACTIVATING THE PHOSPHORESCENCE OF A STRUCTURE, METHOD FOR PRODUCING A PHOSPHORESCENT STRUCTURE AND PHOSPHORESCENT STRUCTURE, LABEL WITH PHOSPHORESCENT STRUCTURE, METHOD FOR WRITING, READING AND ERASING A LABEL, AND A UV SENSOR

(71) Applicant: Technische Universitat Dresden, Dresden (DE)

(72) Inventors: Max Gmelch, Dresden (DE); Heidi Thomas, Radebuel (DE); Sebastian Reineke, Dresden (DE); Felix Simon Fries, Dresden (DE); Paul-Anton Will, Dresden (DE)

(73) Assignee: Technische Universitat Dresden

( * ) Notice: Subject to any disclaimer, the term of this patent is extended or adjusted under 35 U.S.C. 154(b) by 414 days.

(21) Appl. No.: 17/270,739

(22) PCT Filed: Aug. 23, 2019

(86) PCT No.: PCT/EP2019/072636
§ 371 (c)(1),
(2) Date: Apr. 27, 2021

(87) PCT Pub. No.: WO2020/039090
PCT Pub. Date: Feb. 27, 2020

(65) Prior Publication Data
US 2021/0261859 A1    Aug. 26, 2021

(30) Foreign Application Priority Data

Aug. 24, 2018  (DE) ...................... 10 2018 214 374.9
Aug. 24, 2018  (DE) ...................... 10 2018 214 375.7

(51) Int. Cl.
C09K 11/07   (2006.01)
F21K 2/00    (2006.01)
G06K 19/06   (2006.01)

(52) U.S. Cl.
CPC ................ C09K 11/07 (2013.01); F21K 2/00 (2013.01); G06K 19/0614 (2013.01); G06K 19/0615 (2013.01); C09K 2211/1022 (2013.01)

(58) Field of Classification Search
CPC ... C09K 11/07; C09K 2211/1022; F21K 2/00; G06K 19/0614; G06K 19/0615
(Continued)

(56) References Cited

U.S. PATENT DOCUMENTS 3,612,866 A    10/1971  Stevens
6,211,526 B1    4/2001  Huston et al.
2003/0064532 A1  4/2003  Chen

FOREIGN PATENT DOCUMENTS

WO   2011097495 A1   8/2011
WO   2012116351 A2   8/2012

OTHER PUBLICATIONS

Hirata et al.: "Efficient Persistent Room Temperature Phosporescence in Organic Amorphous Materials under Ambient Conditions"; Adv. Funct. Mater.; 2013; pp. 3386-3397; vol. 23; ISSN 1616-3028.
(Continued)

Primary Examiner — Daniel A Hess
(74) Attorney, Agent, or Firm — BARNES & THORNBURG LLP; Jeffrey R. Stone

(57) ABSTRACT

A method for activating and/or deactivating the phosphorescence of a structure is disclosed. The structure may include a first and a second material, wherein a phosphor is admixed with the first material and oxygen is present in the region of the phosphor. The second material may be oxygen-impermeable at an ambient temperature and, in the oxygen-
(Continued)

impermeable state, act as an oxygen barrier between the first material and a surrounding environment. To activate the phosphorescence, in a first activation step, oxygen present in the structure is photochemically deactivated by irradiating the structure with light of a first characteristic, and, in a second activation step, the phosphorescence is activated by irradiating the structure with light of a second characteristic. To deactivate the phosphorescence, oxygen is introduced into the structure by heating the structure and/or by irradiating the structure with light of a third characteristic.

20 Claims, 3 Drawing Sheets

(58) Field of Classification Search
USPC .................................................... 235/462.01
See application file for complete search history.

(56) References Cited

OTHER PUBLICATIONS

Redondo et al.; "Simultaneous fluorescence and phosphorescence from organic molecules"; SPIE Newsrooms; 2015; DOI: 10.1117/2.1201508.006066.

Filatov et al.; "Protection of densley populated excited triplet state ensembles against deactivation by molecular oxygen"; Chem. Soc. Rev; pp. 4668-4689; vol. 45; No. 17; ISSN 0306-0012.

Chen et al.: "Room temperature phosphorescence from moisture-resistant and oxygen-barred carbon dot aggregates" Journal of Materials Chemistry; Issue 25; May 23, 2017.

German Office Action for corresponding DE patent application 10 2018 214 375.7; dated May 6, 2019; 6 pages (for informational purpose only).

German Office Action for corresponding DE patent application 10 2018 214 374.9 dated Feb. 12, 2019; 4 pages (for informational purpose only).

International Search Report issued for corresponding European patent application PCT/EP2019/072636; dated Dec. 2, 2020; 6 pages (for informational purpose only).

METHOD FOR ACTIVATING AND DEACTIVATING THE PHOSPHORESCENCE OF A STRUCTURE, METHOD FOR PRODUCING A PHOSPHORESCENT STRUCTURE AND PHOSPHORESCENT STRUCTURE, LABEL WITH PHOSPHORESCENT STRUCTURE, METHOD FOR WRITING, READING AND ERASING A LABEL, AND A UV SENSOR

CROSS-REFERENCE TO RELATED APPLICATIONS

This is a national phase application of PCT/EP2019/072636, filed on Aug. 23, 2019, which claims priority to German Application DE 10 2018 214 375.7, filed on Aug. 24, 2018, and to German Application DE 10 2018 214 374.9, filed on Aug. 24, 2018, the contents of each of which are incorporated herein by reference in their entirety.

TECHNICAL-FIELD

The invention is based on a process for generating phosphorescence.

BACKGROUND

The project leading to this application was funded by the European Research Council (ERC) through the European Union's Horizon 2020 Research and Innovation Program (Grant Agreement No. 67913 "BILUM"). Phosphorescence has been known for a long time and is the property of a substance to continue to glow for a period of time after being irradiated with light. The long afterglow of phosphorescence distinguishes it from fluorescence, which very quickly becomes imperceptible when the irradiation is discontinued.

Phosphorescence and fluorescence occur when a substance is excited by incident light and electrons of the substance change from a low energy level, for example the ground state, to a higher energy level. Transitions between energy levels follow certain selection rules. There are transitions with high transition probabilities, which occur quickly, and there are transitions with low transition probabilities, which occur slowly.

If an electron changes from a higher energy level via a probable, and thus fast, transition to a lower energy level, fluorescence occurs. However, an electron can also transition from a higher energy level to a lower energy level without radiation via so-called intercombination, from which the transition to the ground state is less probable. The electron then stays longer in this excited lower energy level until it transitions to the ground state. The excited low energy level serves, so to speak, as a reservoir for electrons, which gradually transition over a long period of time from the excited low energy level to the ground state, emitting light in the process. This is called phosphorescence.

Both inorganic phosphorescent substances and organic phosphorescent substances are known from the prior art. Inorganic phosphorescent materials, such as europium-doped $SrAL_2O_4$, are powdery materials, difficult to process or require rare earths and are therefore expensive. The organic phosphorescent substances are easier to handle and less expensive. In organic compounds, the ground state is usually a singlet state in which all electrons are paired. For example, a phosphorescent transition in organic substances is the transition from an excited triplet state to the ground state. This transition is quantum mechanically "forbidden" and therefore associated with low transition probability and long electron residence times in the excited triplet state.

However, phosphorescence in organics from an excited triplet state is not readily observed. Oxygen, which is usually present in a triplet state, interacts with the electrons in the excited triplet state, thereby depopulating it rapidly. Thus, there is no long-lasting afterglow.

Significant efforts have been made to prevent this. For example, phosphorescent materials are usually generated within a vacuum or in an inert gas and provided with an oxygen barrier. However, these methods are cumbersome and expensive. Another approach is to deactivate the oxygen in the phosphorescent material. This is attempted with UV light and heavy metal-containing solutions or gels, but is far from technically feasible and, because of toxicity, is not a good alternative for applications that in an area with possible human contact, such as with toys.

DETAILED DESCRIPTION

Figure 1:
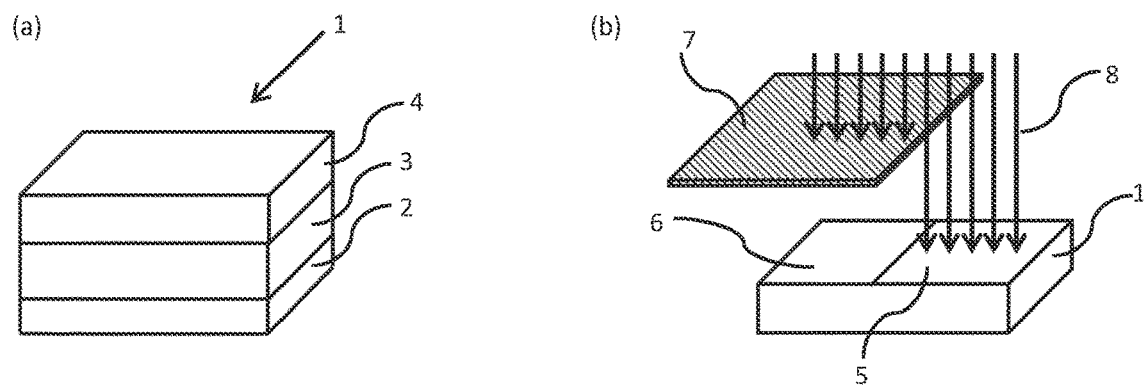
FIGS. 1A-1B show schematic views of the structure and the method for activating phosphorescence of the structure according to an exemplary aspect of the present Disclosure.

It is a task of the present Disclosure to avoid the disadvantages mentioned in connection with the prior art and to provide a method for activating and deactivating the phosphorescence of a structure, a method for producing a phosphorescent structure, and a phosphorescent structure which is inexpensive, readily available and simple to produce. The problem may be solved at least by a method according to Example 1 and by the method of Example 2.

The task of the present Disclosure may be further solved by a method for activating and deactivating the phosphorescence of a structure, wherein for activation in a first activation step for photochemically deactivating oxygen in the structure, the structure may be illuminated with light of a first characteristic, and in a second activation step for initiating the phosphorescence, the structure may be illuminated with light of a second characteristic, wherein for deactivation in a deactivation step, oxygen is introduced into the structure. This enables the activation of the phosphorescence of a structure with phosphorescent organic materials, which was produced under normal atmospheric pressure, in which oxygen is thus present in the region of the phosphorescent organic materials. The oxygen may stop the phosphorescence. Only the photochemical deactivation of the oxygen in the first activation step may make possible the initiation of phosphorescence in the second activation step by pumping electrons into a long-lived higher-energy state by the light of the second characteristic and the long-term residence of the electrons there until excitation with emission of a photon.

The deactivation of the phosphorescence of the structure may be achieved in the deactivation step by introducing oxygen.

Furthermore, it is advantageously possible with the method according to the Disclosure to activate the phosphorescence of the structure and to deactivate it again by the deactivation step. It is widely possible to reactivate the phosphorescence of the structure after deactivation. For the purposes of the present Disclosure, the terms irradiating light, irradiating light, illuminating with light, and illuminating with light, as well as the terms irradiating, irradiating and illuminating should be understood as being synonymous.

It is conceivable to perform the activation and/or the deactivation of the phosphorescence only on parts of the structure. Thus, it is advantageously possible to design areas of the structure with activated phosphorescence and areas of the structure with deactivated phosphorescence. The partial activation and/or deactivation of phosphorescence enables geometric patterns on the structure to be activated and/or deactivated. It is conceivable that information can be stored by the geometric patterns. To this end, it is conceivable, for example, to execute the patterns as a font, logo, image, or machine-readable code, such as a bar code or a QR code.

Due to the possibility of activating phosphorescence and deactivating phosphorescence, the geometric design of phosphorescent and non-phosphorescent areas on the structure may be reversible. That is, a designed phosphorescent pattern may be producible and erasable. The structure may then be suitable for producing a pattern again. That is, the structure may be rewritable using a method of the Disclosure.

In particular, the first material may comprise a first organic material and/or the second material may comprise a second organic material. Preferably, the first material may be a first organic material and/or the second material may be a second organic material.

As a result, the use of metals or rear earth elements that are expensive and/or are harmful to health and the environment can be dispensed with.

In a preferred aspect of the Disclosure, the first material includes a first organic material that is oxidizable by singlet oxygen. Preferably, the first material may be a first organic material. Preferably, the first organic material may be capable of forming a chemical bond with singlet oxygen. For example, the first material may comprise a polymer, preferably an organic polymer. Preferably, the first material may be a polymer, especially an organic polymer. Preferably, the first material may be transparent and can be processed by wet processing. For example, the first material may comprise polymethyl methacrylate (PMMA), polystyrene (PS) and/or cycloolefin copolymers (COC).

In a preferred aspect of the Disclosure, the second material may comprise a second organic material, preferably an organic polymer. The second material may preferably be an organic polymer. The second material may preferably have a second organic material that is impermeable to oxygen at ambient temperature. Preferably, the second material may be transparent and can be processed, for example, by wet processing. Particularly preferably, the second material may be a second organic material that can be processed in combination with the first material. The second material may comprise, for example, polyvinyl alcohol (PVA) and/or ethylene vinyl alcohol (EVOH) copolymers. The phosphor may be mixed with the first, in particular organic, material, for example the phosphor and the first, in particular organic, material form a host-guest complex, with the first, in particular organic, material forming the host and the phosphor acting as the guest. Oxygen, in particular molecular oxygen, i.e. $O_2$, is present in the region of the phosphor. Preferably, the oxygen, in particular the molecular oxygen, is not bound to the phosphor and/or to the first, in particular organic, material in the non-irradiated and/or non-heated state, i.e., for example, at an ambient temperature.

In a preferred aspect of the Disclosure, the phosphor is an organic phosphor that is particularly preferably capable of being excited to phosphorescence at an ambient temperature. Preferably, the phosphor is an organic phosphor whose phosphorescence is inhibited by oxygen. Particularly preferably, the phosphor is an organic phosphor that can be processed by wet processing.

For the purposes of the present Disclosure, the ambient temperature refers to the temperature of the medium surrounding the structure during activation and/or deactivation, for example air, at which the second material, in particular an organic material, is impermeable to oxygen. Preferably, the ambient temperature is room temperature, i.e. 293 K. In the oxygen-impermeable state, the second, in particular organic, material advantageously prevents oxygen from penetrating to the first, in particular organic, material and/or the phosphor admixed thereto. By introducing heat and/or light, i.e. thermally and/or photochemically, oxygen, in particular molecular oxygen, may be introduced into the structure in the deactivation step.

Preferably, the oxygen may penetrate to the first, in particular organic, material and/or the phosphor and may stop the phosphorescence.

Advantageous aspects of the Disclosure can be taken from the dependent claims, as well as from the description with reference to the drawings.

According to a preferred aspect of the Disclosure, in the deactivation step, the heat and/or the light of a third characteristic transforms the second, in particular organic, material from an oxygen-impermeable state to an oxygen-permeable state, so that oxygen penetrates to the first, in particular organic, material and/or the phosphor and inhibits phosphorescence. Preferably, molecular oxygen diffuses through the oxygen permeable second, in particular organic, material. For example, infrared light (IR light) may be used as the light of the third characteristic. This advantageously favors the introduction of oxygen to deactivate the phosphorescence. Preferably, in the deactivation step, heat is introduced into the structure by the light of the third characteristic, the heat converting the second, in particular organic, material from an oxygen-impermeable state to an oxygen-permeable state. Alternatively or additionally, the second, in particular organic, material may be photochemically converted from an oxygen-impermeable state to an oxygen-permeable state.

According to a preferred aspect of the present Disclosure, the introduction of oxygen is deferred in the deactivation step. Deferment is advantageously the simplest method for deactivation. Due to imperfections of the structure, oxygen is introduced over time by diffusion processes. Heating the structure produces a much faster introduction of oxygen. Illuminating the structure with light of the third characteristic is an advantageously elegant and simple technical realization of heating the structure.

According to a further preferred aspect of the present Disclosure, it is provided that light of the first characteristic is used as light with a first intensity, wherein the light of the first characteristic has a wavelength of less than 700 nm, preferably less than 550 nm, particularly preferably less than 460 nm, wherein preferably as light of the second characteristic the light of the first characteristic with a second intensity is used. The light of the first characteristic thus has a first intensity and the light of the second characteristic has a second intensity, the second intensity preferably being different from the first intensity. Particularly preferably, the light of the first characteristic and the light of the second characteristic differ only in intensity.

This advantageously allows for deactivation of oxygen in a photochemical reaction. The light of the first characteristic is preferably UV light, for example UV light with a wavelength of approximately 365 nm.

Furthermore, it is advantageously possible to use the same light source for the light of the first characteristic and the light of the second characteristic if the light of the first characteristic and the light of the second characteristic do not differ in wavelength but differ in intensity, i.e. the light of the second characteristic is the light of the first characteristic with a second intensity. The light of the first characteristic then has a first intensity. In this case, the first intensity is higher than the second intensity. It is conceivable that the first intensity is 10 times to 100 times greater, preferably 20 times to 90 times greater, particularly preferably 50 times to 80 times greater and in particular circa 70 times greater than the second intensity. It is conceivable that the first intensity is between 1 mWcm$^{-2}$ and 20 mWcm$^{-2}$, preferably between 3 mWcm$^{-2}$ and 15 mWcm$^{-2}$, particularly preferably between 5 mWcm$^{-2}$ and 10 mWcm$^{-2}$ and in particular at circa 7 mWcm$^{-2}$. Furthermore, it is conceivable that the second intensity is between 0.01 mWcm$^{-2}$ and 1 mWcm$^{-2}$, preferably between 0.05 mWcm$^{-2}$ and 0.5 mWcm$^{-2}$ and in particular at circa 0.1 mWcm$^{-2}$.

It is conceivable that one or more filters and/or two polarizers and/or one or more beam splitters are used to generate the difference of the first intensity and the second intensity, i.e. to generate the attenuation of the light intensity.

According to a preferred further aspect of the present Disclosure, it is provided that in the first activation step the oxygen is bound to a first, in particular organic, material in a binding step, wherein prior to the binding step the oxygen is preferably converted from a triplet ground state of the oxygen to an excited singlet state of the oxygen in a triplet-triplet interaction with a phosphor admixed to the first, in particular organic, material.

This advantageously enables photochemical deactivation of the oxygen, thus making phosphorescence possible. The oxygen is usually present in a triplet ground state of oxygen. The oxygen is preferably converted from the triplet ground state of oxygen to an excited singlet state of oxygen in a triplet-triplet interaction with the phosphor. This excited singlet state of oxygen is highly reactive. Thus, the oxygen can be bound in the binding step by oxidation of the first, especially organic, material. Conceivably, the phosphor is a doping of the first, in particular organic, material.

According to a preferred further aspect of the present Disclosure, it is provided that prior to the triplet-triplet interaction of the light of the first characteristic, the phosphor is transferred from a singlet state of the phosphor to an excited singlet state of the phosphor and subsequently by intercombination from the excited singlet state of the phosphor to a triplet state of the phosphor, wherein preferably in the second activation step the phosphor is transferred from a singlet state of the phosphor to an excited triplet state of the phosphor. Preferably, the phosphor is organic. The phosphor is typically in an unexcited singlet state, preferably the singlet ground state. The light of the first characteristic converts the phosphor to an excited singlet state of the phosphor from which the phosphor can transition by intercombination to an excited triplet state of the phosphor, which is then available for triplet-triplet interaction with oxygen.

According to a preferred further aspect of the present Disclosure, heat is introduced into the structure in the deactivation step by the light of the third characteristic, wherein preferably a second, in particular organic, material is converted from an oxygen impermeable state to an oxygen permeable state by the heat.

The second, in particular organic, material may form an oxygen barrier in the non-irradiated and/or non-heated state, which keeps oxygen away from the first, in particular organic, material and thus enables a reduction of the unbound oxygen by oxidation of the first, in particular organic, material carried out in the first activation step. Conceivably, by irradiating the third light, i.e., the light of the third characteristic, preferably IR light, the first, in particular organic, material is heated and this heat is transported to the second, in particular organic, material. The heat transfers the second, in particular organic, material from an oxygen-impermeable state to an oxygen-permeable state. Thus, oxygen penetrates to the first, in particular organic, material and stops phosphorescence. Conceivably, the second, particularly organic, material includes ethylene vinyl alcohol (EVOH) copolymers and/or polyvinyl alcohol (PVA). Preferably, the second, in particular organic, material exclusively includes EVOH or PVA, apart from any impurities that may be due to production technology.

According to a preferred further aspect of the present Disclosure, it is provided that a long-chain organic polymer, preferably polymethyl methacrylate (PMMA), polystyrene (PS) and/or cycloolefin copolymers (COC), is used as the first, in particular organic, material, wherein the first, in particular organic, material preferably has the phosphor as a dopant and/or as a side chain. That is, the first material includes an organic material. Preferably, the first material includes a long-chain organic polymer. Particularly preferably, the first material includes PMMA, PS and/or COC. Particularly preferably, the first material is an organic material and exclusively includes a long-chain polymer, in particular PMMA, PS or COC. Preferably, PMMA, PS or COC forms a host-guest complex with the phosphor. PMMA, PS and COC are inexpensive, robust and very easy to process. In this context, PMMA, PS and COC are optically transparent, essentially non-toxic, and advantageously suitable for binding oxygen in the first activation step and thus deactivating it.

According to a preferred further aspect of the present Disclosure, it is provided that as phosphor N,N'-di(1-naphthyl)-N,N'-diphenyl-(1,1'-biphenyl)-4,4'-diamines (NPB), tetra-N-phenylbensidines (TPB), PhenDPA, PhenTPA, thianthrenes (TA), benzophenone-thianthrenes (BP-TA), Bromo-benzophenone-thianthrenes (Br-BP-TA), benzophenone-2-thianthrenes (BP-2TA), diphenylsulfone-thianthrenes (DPS-TA), diphenylsulfone-2-thianthrenes (DPS-2TA), Bromodiphenylsulfone-thianthrenes (Br-DPS-TA), difluoroborone-9-hydroxyphenalenones (BF$_2$(HPhN)), and/or difluoroborone-6-hydroxybenz[de]anthracene-7-one (BF$_2$(HBAN)) are used. NPB is widely used in the semiconductor industry, for example in the production of OLEDs. It is easy to process and inexpensive. Preferably, the phosphor features NPB, PhenDPA, PhenTPA, TA, BP-TA, Br-BP-TA, BP-2TA, DPS-TA, DPS-2TA, Br-DPS-TA, BF$_2$(HPhN) and/or BF$_2$(HBAN). Particularly preferably, the phosphor exclusively includes NPB, PhenDPA, PhenTPA, TA, BP-TA, Br-BP-TA, BP-2TA, DPS-TA, DPS-2TA, Br-DPS-TA, BF$_2$ (HPhN) or BF$_2$ (HBAN).

The phosphor is preferably selected from the group of the following compounds:

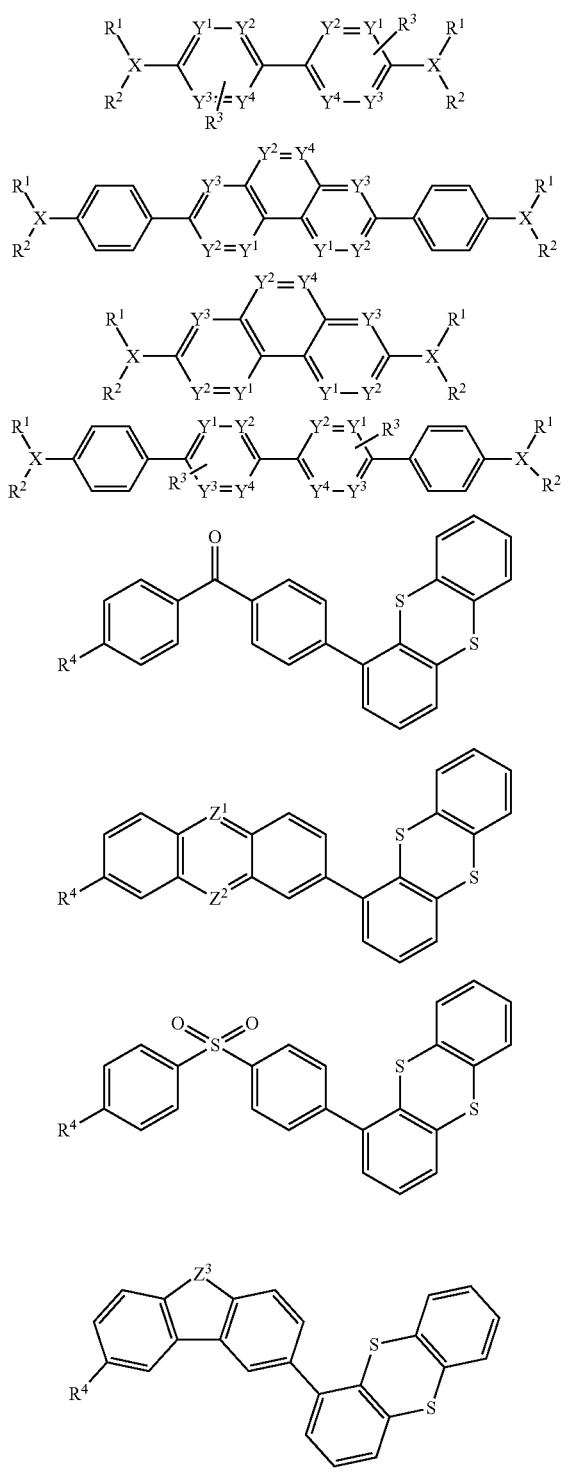

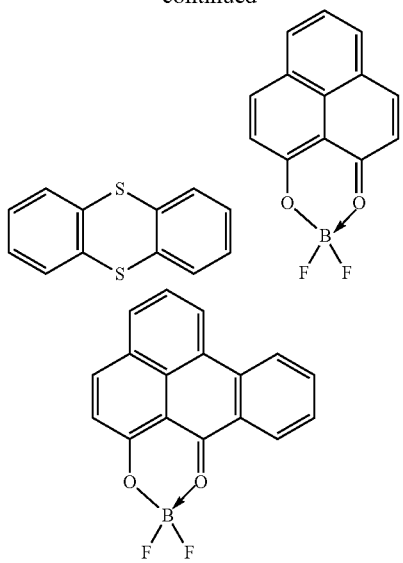

wherein $R^1$, $R^2$, and $R^3$ are identical or different from each other. Furthermore:

$R^1$ may be a substituted or unsubstituted aryl or a substituted or unsubstituted heteroaryl or a substituted or unsubstituted alkyl or a substituted or unsubstituted heteroalkyl or hydrogen;

$R^2$ may be a substituted or unsubstituted aryl or a substituted or unsubstituted heteroaryl or a substituted or unsubstituted alkyl or a substituted or unsubstituted heteroalkyl or hydrogen;

$R^3$ may be a substituted or unsubstituted alkyl or a substituted or unsubstituted heteroalkyl or hydrogen or nitro group.

$R^3$ may be selected from the group H, $OR^4$ or $NO_2$; $R^4$ may be H or a (C1-C8) alkyl; $R^5$ may be either H, a halogen or a thianthrene; X is P or N; $Y^1$, $Y^2$, $Y^3$ and $Y^4$ are each independently selected from C or N, where either two or four of $Y^1$, $Y^2$, $Y^3$ and $Y^4$ are N. $Z^1$ and $Z^2$ are preferably independently selected from each other. $Z^1$ is either an enol or sulfoxide. $Z^2$ is absent or a heteroatom or selected from the group consisting of —$NR^4$. $Z^3$ is selected from the group consisting of —$NR^4$ or —$CR^4R^4$. According to a preferred further aspect of the present Disclosure, it is provided that the structure is partially covered with a mask in the first activation step and/or the structure is only partially illuminated in the first activation step with the first light from a light beam meandering locally or scanning line by line and/or the structure is only partially illuminated in the first activation step by illuminating the structure with a light beam having a steel profile.

Steel profile of a light beam in the sense of the present Disclosure means that the intensity of the light beam incident on the surface of the structure varies locally to such an extent that the intensity of the light beam is above a threshold value for carrying out a reaction at points of high intensity and below this threshold value at points of low intensity. The reaction can be, for example, the transfer of the phosphor from the singlet state of the phosphor to the excited singlet state of the phosphor or the heating up to the transfer of the second, in particular organic, material from the oxygen impermeable state to the oxygen permeable state.

This enables the targeted partial activation of the phosphorescence of the structure and thus the creation of geometric phosphorescent patterns. This makes it possible, for example, to deposit information in the form of writing, images, logos, codes, pictograms, machine-readable writing, bar codes, QR codes, or the like on the structure. Due to the possibility of repeated activation, deactivation, and reactivation of the phosphorescence, the structure can be rewritten several times.

It is also conceivable that the structure in the deactivation step is partially covered with a mask and/or the structure in the deactivation step is only partially illuminated with the light of the third characteristic by a locally meandering or line-scanning light beam and/or the structure in the deactivation step is only partially illuminated by illuminating the structure with a light beam having a steel profile.

Another object of the present Disclosure is a structure for use in a method according to any one of Examples 1 to 12, wherein the structure includes a first and a second material, wherein a phosphor is admixed with the first material and oxygen is present in the region of the phosphor in the non-irradiated and/or non-heated state, and wherein the second material is oxygen impermeable at an ambient temperature and acts as an oxygen barrier between the first material and an environment of the structure in the oxygen impermeable state. Preferably, the first material includes a first organic material and/or the second material includes a second organic material. Particularly preferably, the first material is a first organic material and the second material is a second organic material. The first, in particular organic, material is preferably different from the second, in particular organic, material. The first, in particular organic, material forms a guest-host complex with the phosphor, for example, wherein the first, in particular organic, material forms the host and the phosphor forms the guest. The second, in particular organic, material acts as an oxygen barrier at an ambient temperature, for example room temperature, i.e. 293 K, and prevents oxygen from penetrating to the first, in particular organic, material, and thus also to the phosphor. Thus, oxygen is prevented from inhibiting phosphorescence.

In a preferred aspect of the Disclosure, the first material includes a first organic material that is oxidizable by singlet oxygen. Particularly preferably, the first material is a first organic material. Preferably, the first organic material is capable of forming a chemical bond with singlet oxygen. For example, the first material includes a polymer, preferably an organic polymer. Particularly preferably, the first material is a polymer, especially an organic polymer. Preferably, the first material is transparent and can be processed by wet processing.

For example, the first material includes polymethyl methacrylate (PMMA), polystyrene (PS) and/or cycloolefin copolymers (COC).

In a preferred aspect of the Disclosure, the second material includes a second organic material, preferably an organic polymer. The second material is preferably an organic polymer. The second material preferably has a second organic material that is impermeable to oxygen at ambient temperature. Preferably, the second material is transparent and can be processed, for example, by wet processing. Particularly preferably, the second material is a second organic material that can be processed in combination with the first material. For example, the second material has polyvinyl alcohol (PVA) and/or ethylene vinyl alcohol (EVOH) copolymers.

In a preferred aspect of the Disclosure, the phosphor is an organic phosphor that is particularly preferably capable of being excited to phosphorescence at an ambient temperature. Preferably, the phosphor may be an organic phosphor whose phosphorescence is inhibited by oxygen. Particularly preferably, the phosphor may be an organic phosphor that can be processed by wet processing. Preferably, the phosphor has NPB, PhenDPA, PhenTPA, TA, BP-TA, Br-BP-TA, BP-2TA, DPS-TA, DPS-2TA, Br-DPS-TA, BF$_2$(HPhN), and/or BF$_2$(HBAN). Particularly preferably, the phosphor exclusively features NPB, PhenDPA, PhenTPA, TA, BP-TA, Br-BP-TA, BP-2TA, DPS-TA, DPS-2TA, Br-DPS-TA, BF$_2$(HPhN), or BF$_2$(HBAN). Particularly preferably, the phosphor has at least one of the following compounds:

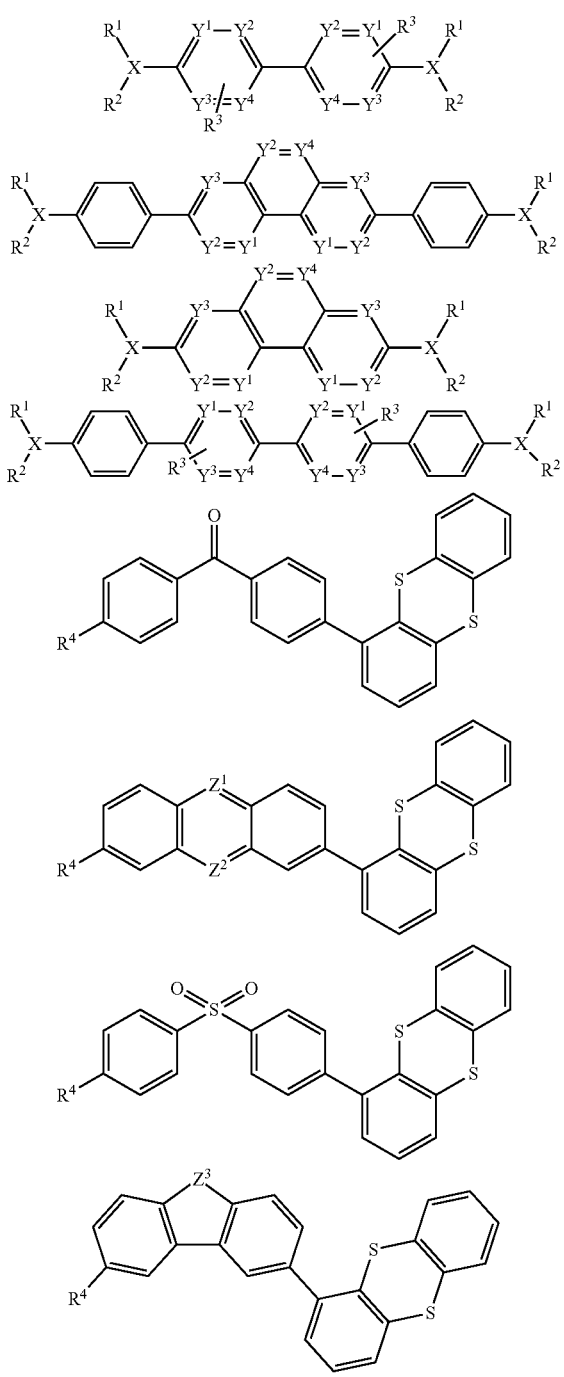

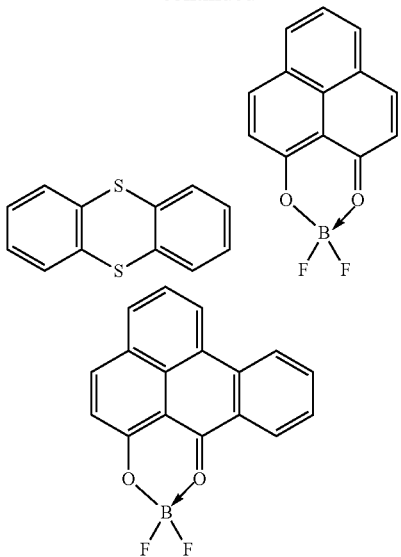

R$^1$, R$^2$ and R$^3$ being identical or different from each other. Furthermore:
- R$^1$ is a substituted or unsubstituted aryl or a substituted or unsubstituted heteroaryl or a substituted or unsubstituted alkyl or a substituted or unsubstituted heteroalkyl or hydrogen;
- R$^2$ is a substituted or unsubstituted aryl or a substituted or unsubstituted heteroaryl or a substituted or unsubstituted alkyl or a substituted or unsubstituted heteroalkyl or hydrogen;
- R$^3$ is a substituted or unsubstituted alkyl or a substituted or unsubstituted heteroalkyl or hydrogen or nitro group. R$^3$ is selected from the group H, OR$^4$ or NO$_2$; R$^4$ is H or a (C1-C8) alkyl; R$^5$ is either H, a halogen or a thianthrene; X is P or N; Y$^1$, Y$^2$, Y$^3$ and Y$^4$ are each independently selected from C or N, where either two or four of Y$^1$, Y$^2$, Y$^3$ and Y$^4$ are N. Z$^1$ and Z$^2$ are preferably independently selected from each other. Z$^1$ is either an enol or sulfoxide. Z$^2$ is absent or a heteroatom or selected from the group consisting of —NR$^4$. Z$^3$ is selected from the group consisting of —NR$^4$ or —CR$^4$R$^4$.

According to a preferred aspect of the Disclosure, the second material, in particular organic material, can be converted from an oxygen impermeable state to an oxygen permeable state by supplying heat and/or light. Preferably, the conversion from the oxygen-impermeable to the oxygen-permeable state is carried out thermally and/or photochemically.

According to another preferred aspect of the Disclosure, the structure includes a substrate. The substrate includes, for example, the second, in particular organic, material. Preferably, the substrate is transparent. For example, the substrate includes a film, in particular a transparent film, or a glass plate. The substrate is preferably provided with an adhesive and/or magnetic underside. For example, the substrate has a self-adhesive and/or magnetic film. Thus, the structure can be applied easily and, in the case of the magnetic foil, reversibly. Conceivably, the substrate is a preferably transparent sheet. It is conceivable, for example, that the substrate is a glass or plastic sheet. However, it is also conceivable that the substrate is flexible. It is further conceivable that the substrate is a film, a rubberized structure or a rubber.

According to a preferred aspect of the Disclosure, the structure includes a first layer with a first layer thickness of the first, in particular organic, material and/or at least one second layer with a second layer thickness of the second, in particular organic, material, wherein the first layer is arranged between the substrate and the at least second layer. Preferably, the structure includes exactly one second layer. Alternatively, the structure has a plurality of, for example two, second layers. The number of layers can determine the quality of the oxygen barrier. In particular, the oxygen impermeability of the oxygen barrier formed at ambient temperature by the second, in particular organic, material increases with the number of second layers of the structure. For example, the first layer thickness is 200 nm to 2000 nm, preferably 900 nm. The at least second layer thickness is, for example, between 800 nm and 30 µm or between 500 nm and 50 µm. Preferably, the sum of the thicknesses of the second layers is between 800 nm and 30 µm or between 500 nm and 50 µm.

According to a preferred aspect of the Disclosure, the first, in particular organic, material and the second, in particular organic, material are applied to the substrate as a mixture.

The first, in particular organic, material preferably includes PMMA, PS and/or COC, in particular the first material is an organic material and exclusively includes PMMA, PS or COC. The second, in particular organic, material preferably includes EVOH and/or PVA, in particular the second material is an organic material and exclusively includes EVOH or PVA.

A further object of the present Disclosure is a method for manufacturing a structure according to any one of Examples 14 to 27, wherein a first, in particular organic, material and a second, in particular organic, material are applied to a substrate, wherein a phosphor is admixed to the first, in particular organic, material.

The method of manufacture may be suitable for producing a structure in which phosphorescence can be activated and deactivated. In particular, the phosphorescence of the structure can also be activated and deactivated in partial areas.

The production process is very simple to carry out and advantageously does not require the absence of oxygen. Thus, the process for fabrication can be carried out outside vacuum chambers or chambers flooded with inert gas.

It is conceivable that the second, in particular organic, material is used as substrate. However, it is also conceivable that glass, metal or plastic is used as the substrate.

According to a preferred aspect of the present Disclosure, it is provided that the first, in particular organic, material is applied to the substrate by means of rotary coating and/or a line application method and/or pipetting and/or a printing method and/or a spraying method, in particular as a first layer, and/or the second, in particular organic, material is applied by means of rotary coating and/or line application method and/or pipetting and/or printing method and/or spraying method, in particular as at least a second layer. Preferably, the first, in particular organic, material and the second, in particular organic, material each form a layer.

It is conceivable that the first, in particular organic, material is PMMA doped with NPB. Alternatively, PMMA and NPB form a guest-host complex, with PMMA acting as host and NPB as guest. It is further conceivable that the first, particularly organic, material is dissolved in an organic solvent for application. Conceivably, the first, in particular organic, material is dissolved in anisole, chlorobenzene, water, or ethyl lactate. Conceivably, the second, in particular organic, material is also dissolved in an organic solvent for application. Conceivably, the second, in particular organic, material is dissolved in anisole, chlorobenzene, water, or ethyl lactate.

Preferably, the first, in particular organic, material and/or the second, in particular organic, material are dried after application. This allows the solvent to be evaporated in a controlled manner. It is conceivable that this is done in an oven or on a hotplate.

Furthermore, it is conceivable that the first, in particular organic, material and the second, in particular organic, material are applied as a mixture. Thus, no oxygen-impermeable substrate is necessary.

According to a further preferred aspect of the present Disclosure, it is envisaged that a solid substrate or a film is used as the substrate, preferably a solid substrate with a self-adhesive rear side facing away from the first, in particular organic, material or a film with a self-adhesive rear side facing away from the first, in particular organic, material.

All of the foregoing statements in the Disclosure apply equally to the method for activation according to the Disclosure, the method for deactivation and the method for activation and deactivation of phosphorescence, the structure according to the Disclosure and the method for production thereof according to the Disclosure. Another object of the Disclosure is a label including a functional layer, wherein the functional layer includes a structure according to any one of Examples 13 to 29.

The label according to the Disclosure can be written and erased several times. The writing is preferably performed by irradiating with light of the first characteristic. By irradiating with light of the first characteristic, oxygen present in the region of the first, in particular organic, material, in particular in the region of the phosphor, is preferably converted into an excited singlet state and reacts with the second, in particular organic, material. The oxygen can thus no longer prevent phosphorescence. Preferably, the label can be read by irradiating it with light of a second characteristic. In particular, the light of the second characteristic excites the phosphor to phosphorescence. The label can be erased by means of the introduction of heat and/or the irradiation of light of a third characteristic, in particular IR light. The introduction of heat and/or the irradiation of light of the third characteristic transforms the second, in particular organic, material from an oxygen-impermeable to an oxygen-permeable state. Oxygen can penetrate from the environment to the first, in particular organic, material and in particular to the phosphor and prevent phosphorescence.

Conceivably, the label includes a substrate. In addition, it is conceivable that the functional layer is arranged on the substrate. It is further conceivable that the substrate is arranged in a plane. However, it is also conceivable that the substrate is arranged in a non-planar surface. For this purpose, the substrate has a non-constant geometric profile. Conceivably, the functional structure has the same geometric profile as the substrate. It is further conceivable that the substrate is impermeable to oxygen.

According to a preferred aspect of the present Disclosure, it is provided that the functional layer includes a first, in particular organic, material and a second, in particular organic, material, wherein a phosphor for phosphorescence is admixed with the first, in particular organic, material and wherein the second, in particular organic, material is in an oxygen-impermeable state at room temperature.

According to a preferred further aspect of the present Disclosure, it is provided that the first, in particular organic, material is arranged in a lower layer and the second, in particular organic, material is arranged in an upper layer, wherein the lower layer is arranged between a substrate and the upper layer. Preferably, the lower layer has a layer thickness of between 200 nm and 2000 nm, preferably between 500 nm and 1500 nm, in particular of circa 900 nm and/or the upper layer has a layer thickness of between 500 nm and 50 µm. It is conceivable that the substrate is made of the second, in particular organic, material. Thus, advantageously, a layer structure consisting of two outer layers of the second, in particular organic, material and a layer of the first, in particular organic, material enclosed by the two outer layers is realized.

Furthermore, however, it is also conceivable that the first, in particular organic, material and the second, in particular organic, material are a mixture.

According to a preferred further aspect of the present Disclosure, it is provided that the functional layer can be transferred from the non-phosphorescent state to the phosphorescent state by the incidence of light of a first characteristic on the first, in particular organic, material and/or can be transferred from the phosphorescent state to the non-phosphorescent state by the incidence of light of a second characteristic on the functional layer and/or can be transferred from the phosphorescent state to the non-phosphorescent state by the introduction of heat into the functional layer.

Conceivably, the light of the first characteristic is also suitable for exciting phosphorescence. The light of the first characteristic may have a wavelength of less than 700 nm, preferably less than 550 nm, particularly preferably less than 460 nm. Preferably, the light of the second characteristic is IR light.

Furthermore, it is advantageously possible to use the same light source for the light of the first characteristic and the light for exciting phosphorescence, if the light of the first characteristic and the light for exciting phosphorescence do not differ in wavelength but in intensity, i.e. the light for exciting phosphorescence is the light of the first characteristic with a second intensity. The light of the first characteristic then has a first intensity. In this case, the first intensity is higher than the second intensity. It is conceivable that the first intensity is 10 times to 100 times greater, preferably 20 times to 90 times greater, particularly preferably 50 times to 80 times greater and in particular circa 70 times greater than the second intensity. It is conceivable that the first intensity is between 1 mWcm$^{-2}$ and 20 mWcm$^{-2}$, preferably between 3 mWcm$^{-2}$ and 15 mWcm$^{-2}$, particularly preferably between 5 mWcm$^{-2}$ and 10 mWcm$^{-2}$ and in particular at circa 7 mWcm$^{-2}$. Furthermore, it is conceivable that the second intensity is between 0.01 mWcm$^{-2}$ and 1 mWcm$^{-2}$, preferably between 0.05 mWcm$^{-2}$ and 0.5 mWcm$^{-2}$ and in particular at circa 0.1 mWcm$^{-2}$.

According to a preferred further aspect of the present Disclosure, it is provided that the first material, in particular organic material, is configured for binding oxygen by the incidence of light of the first characteristic. This allows oxygen to be removed from the functional layer, thus enabling phosphorescence.

According to a preferred further aspect of the present Disclosure, it is provided that the second, in particular organic, material is convertible to an oxygen permeable state by the incidence of light of the second characteristic and/or the application of heat. Thus, it is advantageously possible to prevent phosphorescence in the functional layer by the introduction of oxygen. It is conceivable that the functional layer is configured in such a way that when light of the second characteristic is incident, the first, in particular organic, material is heated and the heat is transported to the second, in particular organic, material. It is further conceivable that this heating allows the second, in particular organic, material to be converted into an oxygen-permeable state.

According to a preferred further aspect of the present Disclosure, it is provided that the first, in particular organic, material is PMMA, PS and/or COC and/or the second, in particular organic, material includes EVOH and/or PVA and/or the phosphor includes NPB, PhenDPA, PhenTPA, TA, BP-TA, Br-BP-TA, BP-2TA, DPS-TA, DPS-2TA, Br-DPS-TA, $BF_2(HPhN)$ and/or $BF_2(HBAN)$. Particularly preferably, the phosphor exclusively features NPB, PhenDPA, PhenTPA, TA, BP-TA, Br-BP-TA, BP-2TA, DPS-TA, DPS-2TA, Br-DPS-TA, $BF_2(HPhN)$, or $BF_2(HBAN)$. These materials are widely used, easy to process and inexpensive. Preferably, two weight percent NPB is admixed to the first, in particular organic, material. According to a preferred further aspect of the present Disclosure, it is provided that the substrate is a film, preferably the side of the substrate facing away from the functional layer is self-adhesive or magnetic. This advantageously enables the label to be easily applied to objects to be labeled. A film is flexible in this case. Thus, the label can also be applied to uneven objects.

According to a preferred further aspect of the present Disclosure, it is provided that the film is transparent. This enables a completely unobtrusive appearance of the label. The label can thus be applied to windowpanes or screens, for example, without affecting their function. This is particularly advantageous in the case of objects to be labeled which offer hardly any surface, which is not visually functional.

According to a preferred further aspect of the present Disclosure, it is provided that the substrate is a plastic plate, preferably a transparent plastic plate, or a metal plate, wherein preferably the side of the substrate facing away from the functional layer is self-adhesive or magnetic. This advantageously enables mechanical protection of the functional layer.

A further object of the present Disclosure is a method for writing on a label according to Example 30, wherein for writing on the label in a writing process, dots of the functional layer are selectively transferred locally from the non-phosphorescent state to the phosphorescent state in a non-contact manner, wherein a phosphorescent region is formed by the dots, wherein during the writing process the phosphorescent region is irradiated with light of a first characteristic, wherein in a binding step the oxygen present in the phosphorescent region is bound to the first, in particular organic, material.

Dot, in the sense of the present Disclosure, means a locally extended location in the functional layer. The sum of all dots is the functional layer. Selectively locally transferable means in the sense of the present Disclosure that the dots are individually selectively transferable. That is, one point can be transferred without transferring another point.

In the sense of the present Disclosure, the phosphorescent region means a region suitable for phosphorescence. In particular, oxygen present in the region of the phosphor or the first material, in particular organic material, is transferred to the excited singlet state only in the phosphorescent region. By selectively irradiating partial areas of the label, oxygen is prevented from inhibiting phosphorescence only in these areas, and thus a structure that can be excited to phosphorescence by irradiation with light is made available only in these areas.

Preferably, during the writing process, the phosphorescent region is irradiated with light of the first characteristic, the functional layer being partially covered with a mask in such a way that only the phosphorescent area is illuminated and/or the functional layer is illuminated with light of the first characteristic by a locally meandering or line-by-line scanning light beam only in the phosphorescent area and/or the functional layer is illuminated only in the phosphorescent area, in that the functional layer is illuminated with a light beam having a beam profile, the beam profile on the functional layer corresponding to the phosphorescent area. The label can thus be quickly and reliably written with a code or other characters.

Advantageously, the character used to write on the label is not visible to the naked eye. In particular, when a transparent substrate is used, the label is thus barely visible to the naked eye. Preferably, the label described is transparent. Advantageously, a label is thus provided which is suitable for use even in exposed locations, for example also on transparent objects such as a glass bottle or a window. It is therefore not necessary to attach labels to the inside or other places of a product that are not directly visible. The label can be attached to the outside of the product in an easily readable location and still remain virtually invisible to traffic. The visual appearance of the product may not be compromised by the label. This simplifies picking, packing and logistics of goods, for example.

The label is preferably read by irradiating the label with light of a second characteristic. Preferably, the light of the second characteristic differs from the light of the first characteristic only in intensity. By irradiating with light of the second characteristic, the phosphor is excited to phosphorescence in the areas previously irradiated with light of the first characteristic. Another object of the present Disclosure is a method for erasing a label according to Example 30, wherein for erasing the label in an erasing process the functional layer is substantially completely converted into the non-phosphorescent state, wherein during the erasing process heat is introduced into the functional layer and/or the functional layer is irradiated with light of a second characteristic, wherein the second material is converted from an oxygen-impermeable state into an oxygen-permeable state by the heat and/or by the irradiation with the light of the second characteristic. Oxygen present in the environment can thus penetrate to the phosphor and inhibit phosphorescence.

Preferably, heat is introduced by irradiation with light of the second characteristic, in particular IR light. This provides a simple, fast and inexpensive method of extinguishing the label.

Another object of the present Disclosure is a method for writing and erasing a label according to Example 30, wherein the label is written in a writing process according to any one of Examples 31 to 33 and erased in a subsequent erasing process according to any one of Examples 34 to 36. Preferably, the label is written in a writing process according to any one of Examples 31 to 33, erased in a subsequent erasing process according to any one of Examples 34 to 36, and rewritten in a writing process following the erasing process according to any one of Examples 31 to 33.

Repeated writing and erasing of the label eliminates the need to apply new labels. According to a preferred aspect of the Disclosure, for writing the label in a writing process, points of the functional layer are selectively transferred locally from the non-phosphorescent state to the phosphorescent state without contact, wherein a phosphorescent region is formed by the points, for erasing the label in an erasing process, the functional layer is transferred substantially completely to the non-phosphorescent state, and for rewriting the label, the writing process is carried out.

According to a preferred aspect of the present Disclosure, it is provided that during the writing operation the phosphorescent region is illuminated with light of the first characteristic, preferably the functional layer is partially covered with a mask such, that only the phosphorescent area is illuminated and/or the functional layer is illuminated with light of the first characteristic by a locally meandering or line-by-line scanning light beam only in the phosphorescent area and/or the functional layer is illuminated only in the phosphorescent area by illuminating the functional layer with a light beam having a steel profile, the beam profile on the functional layer corresponding to the phosphorescent area.

According to a preferred aspect of the present Disclosure, it is provided that UV light is used as the light of the first characteristic, wherein preferably oxygen is bound to the first, in particular organic, material in a binding step, wherein prior to the binding step preferably the oxygen is converted from a triplet ground state of oxygen to an excited singlet state of oxygen in a triplet-triplet interaction with the phosphor, wherein the phosphor is transferred from a singlet state of the phosphor to an excited singlet state of the phosphor prior to the triplet-triplet interaction by the light of the first characteristic, and subsequently by intercombination from the excited singlet state of the phosphor to an excited triplet state of the phosphor. According to a preferred further aspect of the present Disclosure, it is provided that heat is introduced into the functional layer during the quenching process, preferably the heat converting the second, in particular organic, material from an oxygen-impermeable state to an oxygen-permeable state.

However, it is also conceivable that oxygen is introduced into the functional layer during the quenching process by waiting. Due to imperfections of the functional layer, the oxygen barrier formed by the second, in particular organic, material is not perfect, so that oxygen can diffuse in over a longer period of time.

According to a preferred further aspect of the present Disclosure, it is provided that the heat is introduced by irradiation with light of the second characteristic, wherein the light of the second characteristic is preferably IR light.

This enables contactless erasure of the information on the label. It is conceivable that in this case the functional layer is partially covered with a mask in such a way that an area to be erased is illuminated and/or the functional layer is illuminated with light of the second characteristic by a light beam meandering locally or scanning line by line only in the area to be erased and/or the functional layer is illuminated only in the area to be erased by illuminating the functional layer with a light beam having a steel profile, the beam profile on the functional layer corresponding to the area to be erased.

Another object of the present Disclosure is a sensor for determining the dose of ultraviolet light, including a structure according to any one of Examples 13 to 29. In particular, the sensor determines the energy absorbed by the sensor per unit area upon irradiation with ultraviolet light. The sensor according to the Disclosure thus provides a measuring device for determining the dose of ultraviolet radiation incident on an object. In particular, the sensor according to the Disclosure provides information on the absolute value of the dose of ultraviolet radiation (UV dose). The sensor does not require any electronics and is thus independent of a power source. Preferably, the sensor is designed as a foil. This allows flexible and easy mounting. Thus, an electronics-free, large-area executable and flexible sensor for the determination of the UV dose is provided.

According to a preferred aspect of the Disclosure, the sensor has a dose threshold value, whereby phosphorescence sets in upon irradiation with ultraviolet light at a dose that corresponds to or exceeds the dose threshold value. The dose threshold may be varied, for example, by the material composition of the structure and by the first and second layer thicknesses of the structure.

According to a preferred aspect of the Disclosure, the sensor has a main extension plane and the dose threshold is homogeneous in the main extension plane. This advantageously provides a sensor for spatially resolved determination of the UV dose. The main extension plane of the sensor runs in particular parallel to the substrate and/or to the first and second layers of the structure. When the main extension plane of the sensor is irradiated with UV light, phosphorescence is triggered in the areas in which the dose threshold is reached or exceeded. In the remaining areas, phosphorescence is inhibited by molecular oxygen present in the structure. In particular, the sensor can be used to determine when and where a specific UV dose defined by the dose threshold has been exceeded.

A two-dimensional UV dose threshold measurement is thus advantageously enabled. According to a preferred aspect of the Disclosure, the sensor has a neutral density filter. With the aid of the neutral density filter, the dose threshold can be set and easily changed. Preferably, the neutral density filter is applied as a foil on the sensor surface. Alternatively, the dose threshold can be set via material parameters of the structure.

According to a preferred aspect of the Disclosure, the sensor has a principal extension plane and the dose threshold has a gradient or gradation of transparency in the principal extension plane. For example, the sensor has a neutral density filter, wherein the neutral density filter has a gradient or gradation of transparency. For example, the neutral density filter is designed as a gradient gray filter or graduated neutral density filter (GND filter). Alternatively or additionally, the material composition of the structure exhibits a gradient or gradation in composition.

According to a preferred aspect of the Disclosure, the dose threshold increases along at least one axis in the principal extension plane. Thus, the UV dose required to trigger phosphorescence changes along at least one axis in the main extension plane of the sensor. For example, the at least one axis is parallel to an edge of the sensor. Preferably, the dose threshold increases along the at least one axis. For example, when irradiated with a low UV dose, the sensor illuminates only in the lower region of the at least one axis due to phosphorescence, while at a higher dose the illuminated region extends along the at least one axis. Preferably, the sensor has a scale along the at least one axis, the scale indicating the respective dose threshold. Thus, the irradiated UV dose can be read directly. The use of reading devices is advantageously avoided. This enables one-dimensional but absolute UV dose value determinations.

A further object of the present Disclosure is a method for spatially resolved determination of a dose of ultraviolet radiation, in particular incident on an object, with a sensor according to one of Examples 39 to 42, wherein in an irradiation step the sensor, preferably with the object, is irradiated with ultraviolet light of a dose to be determined and wherein in a determination step in the regions of the main extension plane of the sensor, in which the irradiated dose reaches or exceeds the dose threshold value, molecular oxygen is bound in the sensor and phosphorescence is triggered, and in the regions of the main extension plane of the sensor in which the irradiated dose falls below the dose threshold value, molecular oxygen in the sensor prevents the occurrence of phosphorescence.

In particular, molecular oxygen present in the region of the first, in particular organic, material and/or in the region of the phosphor prevents phosphorescence in the regions of the main extension plane of the sensor in which the irradiated dose falls below the dose threshold. In the regions of the main extension plane of the sensor in which the irradiated dose reaches or exceeds the dose threshold, molecular oxygen present in the region of the first, in particular organic, material and/or in the region of the phosphor is photochemically deactivated. In particular, the oxygen is bound to the first, in particular organic, material. The oxygen can thus no longer prevent phosphorescence. Further irradiation with UV light stimulates the phosphor to phosphoresce.

Advantageously, this provides a method for two-dimensional UV dose threshold determination. In particular, the method according to the Disclosure can be used to check the homogeneity of an irradiation with UV light. If the phosphorescence appears everywhere and simultaneously in the main extension plane of the sensor, the UV dose is homogeneous.

A further object of the present Disclosure is a method for absolute value determination of a dose of ultraviolet radiation, in particular incident on an object, with a sensor according to any one of Examples 43 to 46, wherein in an irradiation step the sensor, preferably with the object, is irradiated with ultraviolet light of a dose to be determined and wherein in a determination step in the regions of the main extension plane of the sensor, in which the irradiated dose in each case reaches or exceeds the dose threshold value which is variable in the main extension plane, molecular oxygen is bound in the sensor and phosphorescence is triggered, and in the regions of the main extension plane of the sensor in which the irradiated dose in each case falls below the dose threshold value which is variable in the main extension plane, molecular oxygen in the sensor prevents the occurrence of the phosphorescence. This advantageously provides a method, in particular for the one-dimensional determination of absolute UV dose values. In particular, molecular oxygen present in the region of the first, in particular organic, material and/or in the region of the phosphor prevents phosphorescence in the regions of the main extension plane of the sensor in which the irradiated dose falls below the dose threshold value. In the regions of the main extension plane of the sensor in which the irradiated dose reaches or exceeds the dose threshold, molecular oxygen present in the region of the first, in particular organic, material and/or in the region of the phosphor is photochemically deactivated. In particular, the oxygen is bound to the first, in particular organic, material. The oxygen can thus no longer prevent phosphorescence. Further irradiation with UV light stimulates the phosphor to phosphoresce.

According to a preferred aspect of the Disclosure, the sensor is irradiated with light and/or heated in a neutralization step, whereby the irradiation and/or heating causes oxygen to penetrate the sensor and prevent phosphorescence. The sensor is thus advantageously neutralized and can be reused for further UV dose determinations. According to a preferred aspect of the Disclosure, the neutralization step is followed by at least one irradiation step and at least one determination step according to one of Examples 47 or 48. The UV dose determination is preferably repeated several times for the same or for different objects and/or for the same or for different UV sources.

According to a preferred aspect of the Disclosure, the sensor is arranged on a roller of a production line. This makes it advantageous to determine the UV dose with which objects on the production line are actually irradiated. Depending on the aspect of the Disclosure, information about the spatial resolution of the UV dose and/or the absolute value of the UV dose can thus be obtained. Preferably, several sensors are arranged on the production line so that both a two-dimensional UV dose threshold measurement and a one-dimensional absolute UV dose measurement are possible. Since the sensor is free of electronics and can be designed as a film, especially a self-adhesive film, it can be easily and cost-effectively integrated into existing production lines.

There is no need for costly installation. The sensor can also be easily adapted to the individual application in terms of size, shape, and sensitivity.

Alternatively, the sensor is arranged directly on the object whose UV dose is to be determined. Here, it is particularly advantageous that the sensor is free of electronics and can be operated independently of a power source. The sensor can be applied directly to the object, for example, as a self-adhesive film.

Further details, features and advantages of the Disclosure will be apparent from the drawings, and from the following description of preferred aspects of the Disclosure based on the drawings. In this connection, the drawings merely illustrate exemplary aspects of the Disclosure, which do not restrict the essential idea of the Disclosure.

In the various figures, identical parts are always provided with the same reference signs and are therefore generally also named or mentioned only once in each case. FIG. 1A shows a schematic view of the structure 1 according to an exemplary aspect of the present Disclosure.

The structure 1 has the substrate 2. The substrate 2 is a transparent film. However, it is also conceivable that the substrate 2 includes the second organic material. The first organic material 3 is deposited on the substrate 2 in a 900 nm thick layer. The first organic material 3 consists, for example, of polymethyl methacrylate (PMMA), to which approximately two mass percent N,N'-di(1-naphthyl)-N,N'-diphenyl-(1,1'-biphenyl)-4,4'-diamine is admixed.

Over the layer of the first organic material 3, the second organic material 4 is applied in another layer and contains ethylene-vinyl alcohol copolymers. In a normal state at room temperature, the second organic material 4 is impermeable to oxygen and serves as an oxygen barrier between the first organic material 3 and the environment of the structure 1. The first material may, for example, alternatively or additionally contain PS and/or COC. In addition to NPB, suitable phosphors include, for example, PhenDPA, PhenTPA, TA, BP-TA, Br-BP-TA, BP-2TA, DPS-TA, DPS-2TA, Br-DPS-TA, $BF_2$ (HPhN) and/or $BF_2$ (HBAN).

FIG. 1B schematically shows the process of activating the phosphorescence 30 of the structure 1, more specifically the first activation step, according to an exemplary aspect of the Disclosure is shown.

The structure 1 is partially illuminated by the light of the first characteristic 8. For this purpose, the structure 1 is partially covered with a mask 7 with respect to the light source of the light of the first characteristic 8. Preferably, the mask has a resolution of up to 700 dpi. The light of the first characteristic 8 thus irradiates the first area 5 of the structure. The second area 6 of the structure is not irradiated by the light of the first characteristic 8.

Figure 2:
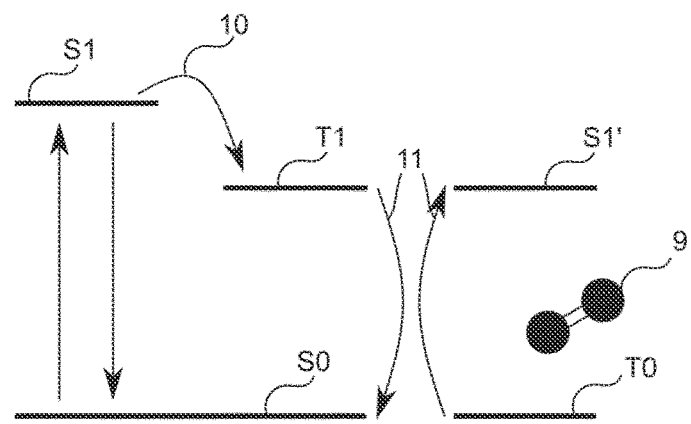
FIG. 2 shows a schematic of the first activation step according to an exemplary aspect of the present Disclosure.

FIG. 2 shows a schematic of the first activation step according to an exemplary aspect of the Disclosure.

The light of the first characteristic 8 (not shown) with a wavelength of approximately 365 nm induces a transition of the phosphor mixed with the first organic material 3 in the first region of the structure 8 (see FIG. 1B) from the singlet state of the phosphorSO to an excited singlet state of the phosphor S1. From this excited singlet state of phosphor S1, a part of the phosphor transitions to an excited triplet state of phosphor T1 via intercombination 10. Oxygen 9 is present in the layer of the first organic material 3, which prevents phosphorescence 30. The oxygen 9 is in a triplet ground state of oxygen T0. In a triplet-triplet interaction 11, the phosphor passes from the excited triplet state of phosphor T1 to the singlet state of phosphor SO and the oxygen 9 passes from the triplet ground state of oxygen T0 to an excited singlet state of oxygen ST. The oxygen 9 is highly reactive in its excited singlet state ST, oxidizing the first organic material 3 and becoming bound (not shown). Thus, the oxygen 9 present in the layer of the first organic material 3 is effectively deactivated. The second organic material 4 acts as an oxygen barrier to prevent additional oxygen from the outside from entering the layer of the first organic material 3. The second region 6 is not illuminated by the light of the first characteristic 8 and consequently is not activated. In this region, the oxygen 9 is not bound to the first organic material 3 and thus is not deactivated.

Figure 3:
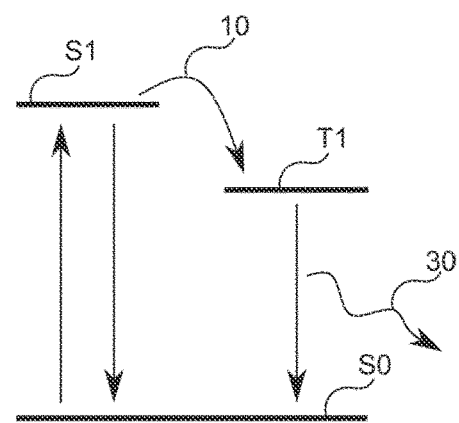
FIG. 3 shows a schematic of the second activation step according to an exemplary aspect of the present Disclosure.

FIG. 3 shows a schematic of the second activation step according to an exemplary aspect of the present Disclosure. For the second activation step, the mask 7 is removed and the light of the first characteristic 8 is still used for irradiation at a significantly reduced intensity (not shown here). In the first region 5, a transition of the phosphor from the singlet state of the phosphor SO to the excited singlet state of the phosphor S1 is then further induced. From this excited singlet state of phosphor S1, the phosphor can transition to the excited triplet state of dopant T1 via intercombination 10. The transition from the excited triplet state of phosphor T1 to the singlet state of phosphor T0 is quantum mechanically "forbidden" and thus the excited triplet state of phosphor T1 has long lifetimes. Nevertheless, transitions from the excited triplet state of phosphor T1 to the singlet state of phosphor SO occur, distributed over a long period of time. Even after the source of light of the first characteristic 8 is switched off, phosphorescence 30 is produced. Since oxygen 9 is not deactivated in the second region 6, it prevents phosphorescence 30 here (see FIG. 1B). Thus, the structure 1 phosphoresces only in the first region 5.

Figure 4:
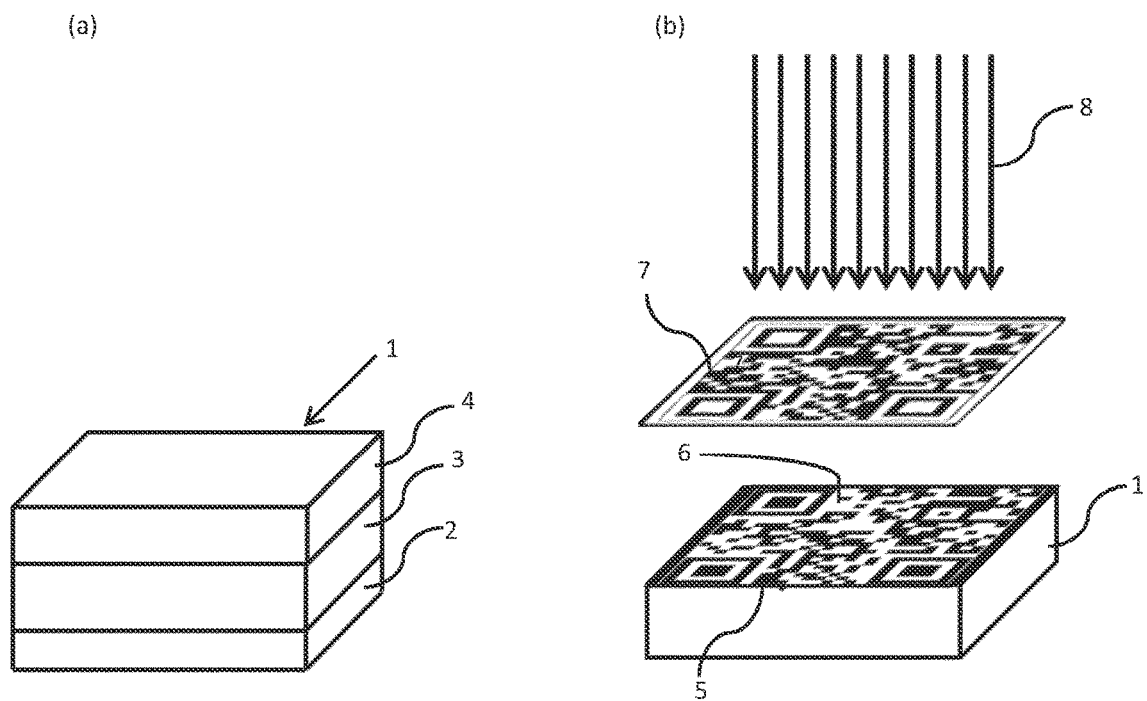
FIGS. 4A-4B show schematic views of the label and the writing according to an exemplary aspect of the present Disclosure.

FIG. 4A shows a schematic view of the label 12 according to an exemplary aspect of the present Disclosure. The label 12 has the substrate 2. The substrate 2 is a transparent film. On the substrate 2, the first organic material 3 is deposited in a 900 nm thick lower layer. The first organic material 3 consists, for example, of polymethyl methacrylate (PMMA), which is admixed with approximately two mass percent N,N'-di(1-naphthyl)-N,N'-diphenyl-(1,1'-biphenyl)-4,4'-diamine. The first material may, for example, alternatively or additionally contain PS and/or COC. In addition to NPB, suitable phosphors include, for example, PhenDPA, PhenTPA, TA, BP-TA, Br-BP-TA, BP-2TA, DPS-TA, DPS-2TA, Br-DPS-TA, $BF_2$(HPhN) and/or $BF_2$(HBAN) as appropriate. Above the layer of the first organic material 3, the second organic material 4 is applied in an upper layer and contains, for example, ethylene-vinyl alcohol copolymers and/or PVA. In a normal state at room temperature, the second organic material 4 is impermeable to oxygen and serves as an oxygen barrier between the first organic material 3 and the environment of the label 12. On the side of the substrate 2 facing away from the first organic material 3, the transparent film is preferably adhesive or magnetic. Thus, it can be easily, and in the case of the magnetic film also reversibly, applied to goods, for example.

FIG. 4B schematically shows the writing of the label 12 according to an exemplary aspect of the present Disclosure. The label 12 is partially illuminated by the light of the first characteristic 8. For this purpose, the label 12 is positioned opposite the light source of the light of the first characteristic 8 partially covered with a mask 7 the mask is preferably a negative of the character with which the label 12 is to be described. Possible characters are for example, one-dimensional, two-dimensional and three-dimensional codes such as barcodes, QR codes or others. It is also conceivable to include an indication of origin on the label. This can be in the form of an image, for example the brand, the manufacturer or supplier. The light of the first characteristic 8 thus irradiates the phosphorescent area 5 of the label. The non-phosphorescent area 6 of the label 12 is not irradiated by the light of the first characteristic 8. The first phosphorescent region 5 can thus be excited to phosphoresce 30 by irradiation of light of the second characteristic. The label 12 can thus advantageously be written with a resolution of up to 700 dpi. The label 12 is usually readable by the naked eye in the written state. Rather, the irradiation of light of the second characteristic is necessary to excite phosphorescence in the area 5. Excitation to phosphorescence in region 6 is not possible because molecular oxygen is present here, which prevents it. Advantageously, therefore, a label 12 is provided whose contents are not visible to the naked eye. The label 12 is erased by the introduction of heat and/or light of a third characteristic. For example, the label 12 will be erased by irradiation with IR light having a wavelength of about 4 μm for a period of 1 min. The radiation is preferably absorbed by PMMA, PS and/or COC, which is heated as a result. The second organic material 4, which acts as an oxygen barrier at ambient temperature, is thus converted to an oxygen-permeable state. The first organic material 3 is again filled with oxygen, phosphorescence is prevented.

Figure 5:
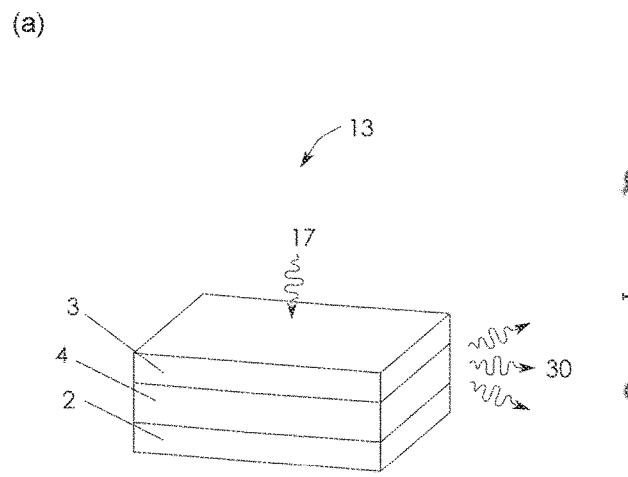
FIGS. 5A-5B show schematic views of the structure and operation of the sensor for determining the dose of ultraviolet light in accordance with an exemplary aspect of the present Disclosure.

Write and erase cycles can be repeated several times. For example, if the write and erase procedures are repeated 40 times, the emission still reaches 40% of its initial value. FIG. 5A schematically shows the structure of the sensor 13 for determining the dose of ultraviolet light 17 according to an exemplary aspect of the present Disclosure. The sensor 13 has a structure 1. The structure 1 has a first and a second material 3, 4, wherein a phosphor is admixed with the first material 3 and oxygen 9 is present in the region of the phosphor, and wherein the second material 4 is impermeable to oxygen at an ambient temperature and, in the oxygen-impermeable state, acts as an oxygen barrier between the first material 3 and an environment of the structure 1. Preferably, the second material 4 is convertible from the oxygen-impermeable state to the oxygen-permeable state by supplying heat and/or light. Preferably, the structure 1 further includes a substrate 2. For example, the substrate 2 includes the second material 4. The substrate 2 preferably includes a film, particularly preferably a self-adhesive or magnetic film. This gives the sensor 13 a high degree of flexibility. Furthermore, the sensor 13 can thus be attached easily, if necessary even reversibly. The structure 1 has, for example, a first layer with a first layer thickness of the first material 3 and/or at least one second layer with a second layer thickness of the second material 4. The first layer is preferably arranged between the substrate 2 and the at least second layer. The first material 3 is preferably an organic material. The second material 4 is also preferably an organic material. The first material 3 and the phosphor preferably form a guest-host complex. For example, the first material 3 includes PMMA, PS and/or COC and the second material 4 includes, for example, EVOH and/or PVA. For example, the phosphor includes NPB, PhenDPA, PhenTPA, TA, BP-TA, Br-BP-TA, BP-2TA, DPS-TA, DPS-2TA, Br-DPS-TA, BFz (HPhN) and/or BFz (HBAN).

The sensor 13 preferably has a dose threshold, wherein when the sensor 13 is irradiated with ultraviolet light 17 at a dose equal to or greater than the dose threshold, phosphorescence 30 begins. The dose threshold is dependent on, and can be varied via, the material composition of the structure 1, among other factors. Irradiation of ultraviolet light 17 causes molecular oxygen 9 present in the region of the first material 3 and/or in the region of the phosphor to be bound by UV energy input. The molecular oxygen 9 can no longer influence the no longer suppress phosphorescence 30. There is a sudden increase in phosphorescence 30 due to further irradiation with UV light. This occurs, depending on the irradiated intensity of the UV radiation, after a defined period of time, see FIG. 5B. The sudden, significant increase in phosphorescence 30 after a defined irradiation time is the basis for dose determination. The irradiation time required for the sudden increase in phosphorescence 30 depends on the material composition, the first and second layer thicknesses, the number of second layers and the intensity of the UV radiation 17. The higher the intensity of the UV radiation 17, the shorter the necessary irradiation time. In this case, the molecular oxygen 9 is only bound in the areas of the sensor 13 in which the dose threshold value is reached or exceeded. This allows a spatially resolved representation of the UV radiation 17 in real time as an on-off state of the phosphorescence 30.

Figure 6:
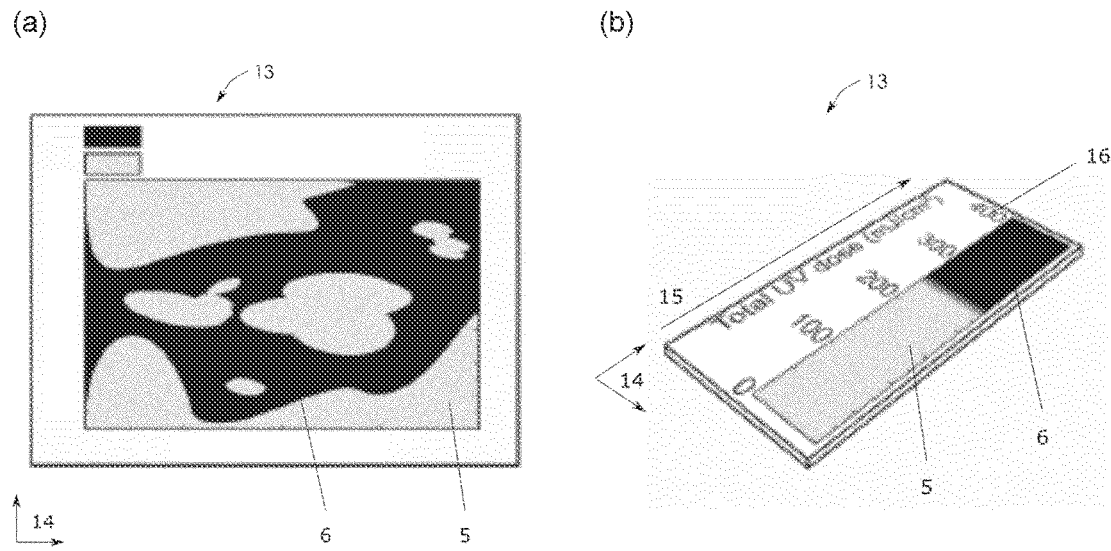
FIG. 6A-6B schematically show the sensor and the method for determining the UV dose according to exemplary aspects of the present Disclosure.

FIG. 6A schematically shows the sensor 13 and the method for determining the UV dose according to an exemplary aspect of the present Disclosure. The sensor 13 has the features described in the description of FIGS. 5A and 5B. The sensor 13 preferably has a main extension plane 14. The main extension plane 14 is parallel to the substrate 2. In the main extension plane 14, the dose threshold is homogeneous. That is, the same UV dose is required at each point in the main extension plane 14 to excite phosphorescence 30. For spatially resolved determination of a dose of ultraviolet radiation, the sensor 13 is irradiated with UV light 17 in an irradiation step at a dose to be determined. In a determination step, in the regions 5 of the main extension plane 14 in which the irradiated dose reaches or exceeds the dose threshold, molecular oxygen 9 is bound in the sensor 13 and phosphorescence 30 is triggered. In the regions 6 in which the irradiated dose falls below the dose threshold, the molecular oxygen 9 present in particular in the region of the first, in particular organic, material 3 and/or in the region of the phosphor prevents phosphorescence 30. In the regions 5 in which the UV dose reaches or exceeds the dose threshold, phosphorescence 30 occurs. In the regions 6 in which the UV dose remains below the dose threshold, no phosphorescence 30 occurs. Thus, the appearance of phosphorescence 30 can be used to determine when and where the UV dose has reached or exceeded the dose threshold. Thus, advantageously, a method for spatially resolved determination of a UV dose is provided. This can be used, for example, to check irradiation homogeneity. Homogeneous irradiation, i.e. irradiation with a spatially homogeneous UV dose, has occurred if the phosphorescence 30 occurs everywhere simultaneously in the main extension plane 14. The dose threshold can be adjusted via material parameters or a neutral density filter preferably arranged on the sensor surface. Preferably, the neutral density filter is designed as a foil. With the sensor 13 according to the described aspect of the Disclosure, two-dimensional UV dose threshold determinations can thus be carried out.

FIG. 6B schematically shows the sensor 13 and the method for determining the UV dose according to an alternative exemplary aspect of the present Disclosure. The sensor 13 has the features described in the description of FIGS. 5A and 5B. Preferably, the sensor 13 has a main extension plane 14. The main extension plane 14 is parallel to the substrate 2. In the main extension plane 14, the dose threshold exhibits a gradient or gradation along an axis 15. Along the axis 15, the dose threshold increases, for example linearly. To realize such a gradient or gradation of the dose threshold, the sensor 13 has, for example, a gray gradient filter or GND filter. Alternatively, the material composition of the structure 1 exhibits a gradient or gradation in composition. In the initial region of axis 15, a lower UV dose is sufficient to excite phosphorescence 30. In the end region of axis 15, a higher UV dose is necessary to produce phosphorescence 30. In an irradiation step, the sensor 13 is irradiated with UV light 17 of a dose to be determined. In a determination step, in the regions 5 of the main extension plane 14 of the sensor 13 in which the irradiated dose reaches or exceeds the dose threshold value variable in the main extension plane 14, respectively, molecular oxygen 9 is bound in the sensor 13 and phosphorescence 30 is triggered. In the areas 6 of the main extension plane 14 in which the irradiated dose in each case falls below the dose threshold value variable in the main extension plane 14, molecular oxygen 9 present in the sensor 13, in particular in the area of the first, in particular organic, material 3 and/or in the area of the phosphor, prevents phosphorescence. At a very low UV dose, the sensor 13 illuminates only in the initial area of the axis 15; at a higher UV dose, the illuminated area 5 grows upward. Preferably, the sensor 13 has a scale 16 along the at least one axis 15, which indicates the respective dose threshold. This allows a direct reading of the irradiated UV dose without additional reading devices. The sensor 13 can thus be used to determine one-dimensional absolute values of the UV dose. The methods described with reference to FIGS. 6A and 6B are preferably followed by a neutralization step in which the sensor 13 is irradiated with light and/or heated. As a result of the irradiation and/or heating, oxygen penetrates the sensor 13 and stops the phosphorescence 30. In particular, the second, in particular organic, material 4 changes from the oxygen-impermeable to an oxygen-permeable state. The second, in particular organic, material 4 no longer acts as an oxygen barrier. Oxygen can penetrate into the structure 1 from the area surrounding the sensor 13. In particular, the oxygen penetrates into the region of the first, in particular organic, material 3 and/or into the region of the phosphor and here prevents phosphorescence 30. The sensor 13 is thus advantageously neutralized and can be used for a further determination of a UV dose. Preferably, the irradiation, determination and neutralization steps are repeated several times, for example for different UV sources or different objects.

Figure 7:
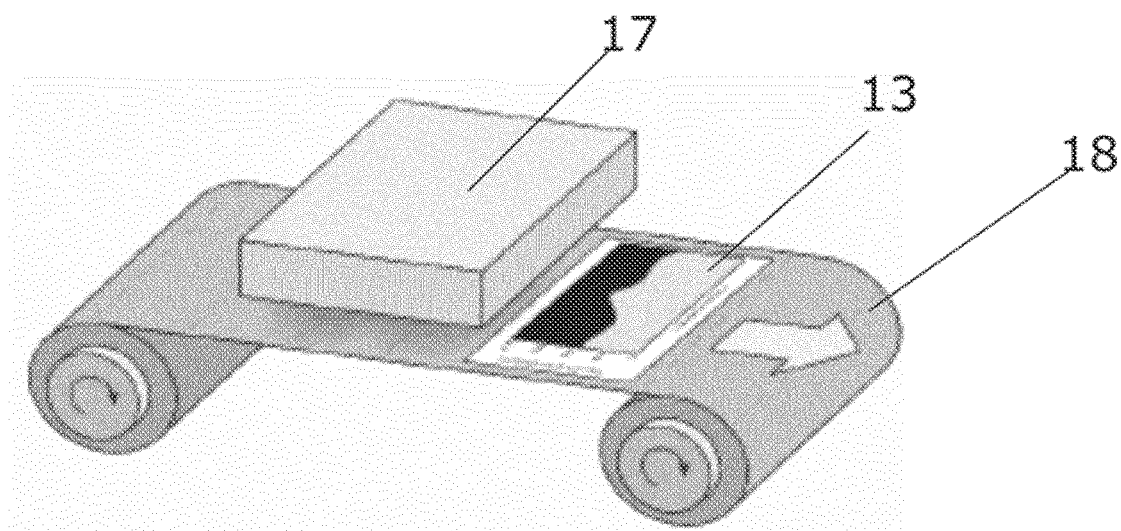
FIG. 7 shows schematically the sensor and the method for determining the UV dose according to an exemplary aspect of the present Disclosure.

FIG. 7 schematically shows the sensor 13 according to an exemplary aspect of the present Disclosure. The sensor 13 has the features described with reference to the preceding FIG. 6B. The sensor 13 is arranged on a roller 18 of a production line. The sensor 13 is preferably bonded to the roll 18. For this purpose, the sensor 13 preferably has a self-adhesive film. The sensor 13 is preferably placed like the objects transported on the roll 18 in ordinary operation.

Thus, the measured values determined by means of the sensor 13 provide information about the UV dose to which the objects are exposed. Alternatively, the sensor 13 is placed directly on the object. For example, the axis 15 runs along the transport direction of the roller 18. The sensor 13 preferably extends perpendicular to the axis 15 over the used width of the roller 18. The roller 18 transports objects, for example, for UV curing under a UV source. The sensor 13 can be used to determine the absolute value of the UV dose over the entire used width of the roller 18. Deviations from the nominal value can thus be identified and corrected if necessary.

Additional aspects of the disclosure will be described by example:

In Example 1, a method for activating the phosphorescence (30) of a structure (1) is disclosed: wherein the structure (1) includes a first and a second material (3, 4); wherein a phosphor is admixed with the first material (3) and oxygen (9) is present in the region of the phosphor; and wherein the second material (4) is oxygen-impermeable at a temperature and, in the oxygen-impermeable state, acts as an oxygen barrier between the first material (3) and an environment of the structure (1); wherein, in order to activate the phosphorescence (30), oxygen (9) present in the structure (1) is photochemically deactivated in a first activation step by irradiating the structure (1) with light of a first characteristic (8), and wherein, in a second activation step, the phosphorescence (30) is initiated by irradiating the structure (1) with light of a second characteristic.

In Example 2, a method for deactivating the phosphorescence (30) of a structure (1) is disclosed, wherein the structure (1) includes a first and a second material (3, 4); wherein a phosphor is admixed with the first material (3); wherein the first material (3) is capable of containing molecular oxygen (9); wherein the second material (4) is oxygen-impermeable at an ambient temperature and in the oxygen-impermeable state, acts as an oxygen barrier between the first material (3) and an environment of the structure (1); wherein oxygen (9) is introduced into the structure (1) in a deactivation step to deactivate the phosphorescence (30) by heating the structure (1) in the deactivation step and/or irradiating it with light of a third characteristic.

In Example 3, a method for activating and deactivating the phosphorescence (30) of a structure (1) is disclosed, wherein the structure (1) includes a first and a second material (3, 4), wherein a phosphor is admixed with the first material (3) and oxygen (9) is present in the region of the phosphor; wherein the second material (4) is oxygen-impermeable at an ambient temperature and, in the oxygen-impermeable state, acts as an oxygen barrier between the first material (3) and an environment of the structure (1); wherein, in order to activate the phosphorescence (30), in a first activation step oxygen (9) present in the structure is photochemically deactivated by irradiating the structure (1) with light of a first characteristic (8); and wherein, in a second activation step, the phosphorescence (30) is activated by irradiating the structure (1) with light of a second characteristic (8); wherein, in order to deactivate the phosphorescence (30), oxygen (9) is introduced into the structure (1) in a deactivation step by heating the structure (1) in the deactivation step and/or by irradiating the structure with light of a third characteristic.

In Example 4, the method of any one of Examples 2 and 3 is disclosed, wherein in the deactivation step the second material (4) is converted from an oxygen impermeable state to an oxygen permeable state by the heat and/or the light of a third characteristic, so that oxygen (9) penetrates to the first material (3) and/or the phosphor and inhibits the phosphorescence (30).

In Example 5, the method of any one of Examples 2 to 4 is disclosed, wherein IR light is used as light of the third characteristic.

In Example 6, the method of any one of Examples 2 to 5 is disclosed, wherein in the deactivation step heat is introduced into the structure (1) from the light of the third characteristic, the heat converting the second material (4) from an oxygen-impermeable state to an oxygen-permeable state.

In Example 7, the method of any one of the preceding Examples 1 and 3 to 6 is disclosed, wherein light with a first intensity is used as light of the first characteristic (8), wherein the light of the first characteristic has a wavelength of less than 700 nm, preferably less than 550 nm, particularly preferably less than 460 nm, wherein preferably the light of the first characteristic (8) with a second intensity is used as light of the second characteristic.

In Example 8, the method of any one of the preceding Examples 1 and 3 to 7 is disclosed, wherein in the first activation step the oxygen (9) is bound to a first material (3) in a binding step, wherein prior to the binding step the oxygen (9) is preferably converted from a triplet ground state of the oxygen (T0) into an excited singlet state of the oxygen (ST) in a triplet-triplet interaction (11) with a phosphor admixed with the first material (3).

In Example 9, the method of Example 8 is disclosed, wherein the phosphor is transferred from a singlet state of the phosphor (SO) to an excited singlet state of the phosphor (S1) by the light of the first characteristic (8) prior to the triplet Triplet interaction (11), and subsequently from the excited singlet state of the phosphor (S1) to an excited triplet state of the phosphor (T1) by intercombination (10), wherein preferably in the second activation step the phosphor is transferred from a singlet state of the phosphor (SO) to an excited triplet state of the phosphor (T1).

In Example 10, the method of any one of Examples 1 to 9 is disclosed, wherein a long-chain organic polymer, preferably polymethyl methacrylate, polystyrene and/or cycloolefin copolymers, is used as the first material (3), wherein the first material (3) preferably has the phosphor as a dopant and/or as a side chain.

In Example 11, the method of any one of Examples 1 to 10 is disclosed, wherein the phosphor used is N,N'-di(1-naphthyl)-N,N'-diphenyl-(1,1'-biphenyl)-4,4'-diamines, tetra-N-phenylbenzidines, PhenDPA, PhenTPA, thianthrenes, benzophenone-thianthrenes, bromo-benzophenone-thianthrenes, benzophenone-2-thianthrenes, diphenylsulfone-thianthrenes, diphenylsulfone-2-thianthrenes, bromo-diphenylsulfone-thianthrenes, difluoroborone-9-hydroxyphenalenones and/or difluoroborone-6-hydroxybenz[de]anthracene-7-one.

In Example 12, the method of any one of the preceding Examples is disclosed, wherein the structure (1) is partially covered with a mask (7) in the first activation step and/or the structure (1) is only partially illuminated in the first activation step with the light of the first characteristic (8) from a locally meandering or line-by-line scanning light beam and/or the structure (1) is only partially illuminated in the first activation step by illuminating the structure (1) with a light beam having a steel profile.

In Example 13, a structure (1) for use in the method of any one of Examples 1 to 12 is disclosed, wherein the structure (1) includes a first and a second material (3, 4), wherein a phosphor is admixed with the first material (3) and oxygen (9) is present in the region of the phosphor in the non-irradiated and/or non-heated state, and wherein the second material (4) is oxygen-impermeable at an ambient temperature and acts as an oxygen barrier between the first material (3) and an environment of the structure (1) in the oxygen-impermeable state.

In Example 14, the structure (1) of Example 13 is disclosed, wherein the second material (4) can be converted from the oxygen-impermeable state to an oxygen-permeable state by supplying heat and/or light.

In Example 15, the structure (1) of Example 13 and 14 is disclosed, wherein the structure (1) includes a substrate (2).

In Example 16, the structure (1) of Example 15 is disclosed, wherein the substrate (2) includes the second material (4).

In Example 17, the structure (1) of any one of Examples 15 and 16 is disclosed, wherein the substrate (2) is transparent.

In Example 18, the structure (1) of any one of Examples 15 to 17 is disclosed, wherein the substrate (2) includes a self-adhesive film.

In Example 19, the structure (1) of any one of Examples 15 to 18 is disclosed, wherein the substrate (2) includes a glass plate.

In Example 20, the structure (1) of any one of Examples 15 to 19 is disclosed, wherein the structure (1) includes a first layer having a first layer thickness of the first material (3) and/or includes at least one second layer having a second layer thickness of the second material (4), wherein the first layer is arranged between the substrate (2) and the at least second layer.

In Example 21, the structure (1) of Example 20 is disclosed, wherein the first layer thickness is between 200 nm and 2000 nm, preferably 900 nm.

In Example 22, the structure (1) of any one of Examples 20 and 21 is disclosed, wherein the second layer thickness is between 800 nm and 30 µm.

In Example 23, the structure (1) of any one of Examples 15 to 22 is disclosed, wherein the first material (3) and the second material (4) are applied as a mixture on the substrate (2).

In Example 24, the structure (1) of any one of Examples 13 to 23 is disclosed, wherein the first material (3) is an organic material and/or the second material (4) is an organic material.

In Example 25, the structure (1) of any one of Examples 13 to 24 is disclosed, wherein the first material (3) includes polymethyl methacrylate, polystyrene and/or cycloolefin copolymers.

In Example 26, the structure (1) of any one of Examples 13 to 25 is disclosed, wherein the second material (4) includes ethylene vinyl alcohol copolymers and/or polyvinyl alcohol.

In Example 27, the structure (1) of any one of Examples 13 to 26 is disclosed, wherein the phosphor includes N,N'-di(1-naphthyl)-N,N'-diphenyl-(1,1'-biphenyl)-4,4'-diamine, tetra-N-phenylbenzidines, PhenDPA, PhenTPA, thianthrenes, benzophenone-thianthrenes, bromo-benzophenone-thianthrenes, benzophenone-2-thianthrenes, diphenylsulfone-thianthrenes, diphenylsulfone-2-thianthrenes, bromo-diphenylsulfone-thianthrenes, difluoroborone-9-hydroxyphenalenones, and/or difluoroborone-6-hydroxybenz[de]anthracene-7-one.

In Example 28, a method of manufacturing a structure (1) of any one of Examples 14 to 27 is disclosed, wherein a first material (3) and a second material (4) are applied to a substrate (2), wherein a phosphor is admixed with the first material (3).

In Example 29, the method of Example 28 is disclosed, wherein the first material (3) is applied as a first layer to the substrate (2) by rotary coating and/or a line application method and/or pipetting and/or a printing method and/or a spraying method, and/or the second material (4) is applied as at least a second layer by rotary coating or a line application method or pipetting.

In Example 30, a label (12) is disclosed including a functional layer, wherein the functional layer includes the structure (1) of any one of Examples 13 to 29.

In Example 31, a method for writing the label (12) of Example 30 is disclosed, wherein for writing the label (12) in a writing process, dots of the functional layer are selectively transferred locally from the non-phosphorescent state to the phosphorescent state in a contactless manner, wherein a phosphorescent region (5) is formed by the dots, wherein during the writing process the phosphorescent region (5) is irradiated with light of a first characteristic (8), wherein in a binding step the oxygen (9) present in the phosphorescent region is bound to the first material (3).

In Example 32, a method for writing on the label (12) of Example 31 is disclosed, wherein during the writing process the phosphorescent region (5) is irradiated with light of the first characteristic (8), wherein the functional layer is partially covered with a mask (15) such, that only the phosphorescent area (5) is illuminated and/or the functional layer is illuminated with light of the first characteristic (8) by a locally meandering or line-by-line scanning light beam only in the phosphorescent area (5) and/or the functional layer is illuminated only in the phosphorescent area (5), in that the functional layer is illuminated with a light beam having a beam profile, the beam profile on the functional layer corresponding to the phosphorescent area (5).

In Example 33, the method of writing the label (12) of any one of Examples 31 and 32 is disclosed, wherein the oxygen (9) is converted from a triplet ground state (T0) of the oxygen (9) to an excited singlet state (ST) of the oxygen (9) by a Triplet-Triplet interaction (11) with the phosphor prior to the binding step, wherein the phosphor is excited from a singlet state (SO) of the phosphor to an excited singlet state (S1) of the phosphor before the triplet-triplet interaction (11) by the light of the first characteristic (8), and subsequently is transferred from the excited singlet state (S1) of the phosphor to an excited triplet state (T1) of the phosphor by intercombination (10).

In Example 34, a method for erasing the label (12) of Example 30 is disclosed, wherein for erasing the label (12) in an erasing process the functional layer is substantially completely converted to the non-phosphorescent state, wherein during the erasing process heat is introduced into the functional layer and/or the functional layer is irradiated with light of a second characteristic, wherein the second material (4) is converted from an oxygen-impermeable state to an oxygen-permeable state by the heat and/or by the irradiation with the light of the second characteristic.

In Example 35, a method for erasing the label (12) of Example 34 is disclosed, wherein the heat is introduced by irradiation with light of the second characteristic.

In Example 36, the method of erasing the label (12) of any one of Examples 34 and 35 is disclosed, wherein the light of the second characteristic is infrared light.

In Example 37, a method of writing and erasing the label (12) of Example 30 is disclosed, wherein the label (12) is written in the writing process of any one of Examples 31 to 33 and erased in the subsequent erasing process of any one of Examples 34 to 36.

In Example 38, a method for writing and erasing the label (12) of Example 30 is disclosed, wherein the label (12) is written in the writing method of any one of Examples 31 to 33, is erased in the subsequent erasing method of any one of Examples 34 to 36, and is rewritten in the writing method following the erasing method of any one of Examples 31 to 33.

In Example 39, a sensor (13) for determining a dose of ultraviolet light (17) is disclosed, including the structure (1) of any one of Examples 13 to 29.

In Example 40, the sensor (13) of Example 39 is disclosed, wherein the sensor (13) includes a dose threshold, wherein upon irradiation with ultraviolet light (17) at a dose equal to or exceeding the dose threshold, phosphorescence (30) begins.

In Example 41, the sensor (13) of Example 40 is disclosed, wherein the sensor (13) includes a main extension plane (14) and the dose threshold is homogeneous in the main extension plane (14).

In Example 42, the sensor (13) of Example 41 is disclosed, wherein the sensor (13) includes a neutral density filter.

In Example 43, the sensor (13) of Example 40 is disclosed, wherein the sensor (13) includes a main extension plane (14) and the dose threshold in the main extension plane (14) includes a gradient or a gradation.

In Example 44, the sensor (13) of Example 43 is disclosed, wherein the sensor (13) includes a neutral density filter, wherein the neutral density filter includes a gradient or gradation of transparency.

In Example 45, the sensor (13) of Example 43 is disclosed, wherein the material composition of the structure (1) includes a gradient or gradation in composition.

In Example 46, the sensor (13) of any one of Examples 43 to 45 is disclosed, wherein the dose threshold increases along at least one axis (15) in the main extension plane (14), and wherein the sensor (13) includes a scale (16) along the at least one axis (15), the scale (16) indicating the respective dose threshold.

In Example 47, a method for spatially resolved determination of a dose of ultraviolet radiation with the sensor (13) of any one of Examples 39 to 42 is disclosed, wherein in an irradiation step the sensor (13) is irradiated with ultraviolet light (17) of a dose to be determined and wherein in a determination step in the regions of the main extension plane (14) of the sensor (13), in which the irradiated dose reaches or exceeds the dose threshold value, molecular oxygen is bound in the sensor (13) and phosphorescence (30) is triggered, and in the regions of the main extension plane (14) of the sensor (13) in which the irradiated dose falls below the dose threshold value, molecular oxygen in the sensor (13) prevents the occurrence of phosphorescence (30).

In Example 48, a method for absolute value determination of a dose of ultraviolet radiation with the sensor (13) of any one of Examples 43 to 46 is disclosed, wherein in an irradiation step the sensor (13) is irradiated with ultraviolet light (17) of a dose to be determined and wherein in a determination step in the regions of the main extension plane (14) of the sensor (13) in which the irradiated dose in each case reaches or exceeds the dose threshold value variable in the main extension plane (14), molecular oxygen is bound in the sensor (13) and phosphorescence (30) is triggered, and in the regions of the main extension plane (14) of the sensor (13) in which the irradiated dose falls below the dose threshold value variable in the main extension plane (14) in each case, molecular oxygen in the sensor (13) prevents the occurrence of the phosphorescence (30).

In Example 49, the method of any one of Examples 47 and 48 is disclosed, wherein the sensor (13) is irradiated with light and/or heated in a neutralization step, wherein the irradiation and/or the heating causes oxygen to enter the sensor (13) and suppress the phosphorescence (30).

In Example 50, the method of Example 49 is disclosed, wherein the neutralization step is followed by at least one irradiation step and at least one determination step of one of Examples 47 or 48, respectively.

In Example 51, the method of any one of Examples 47 to 50 is disclosed, wherein the sensor (13) is arranged on a roller (18) of a production line.

LIST OF REFERENCE SIGNS

1 Structure
2 Substrate
3 First organic material
4 Second organic material
5 First region
6 Second area
7 Mask
8 Light of first characteristic
9 Oxygen
10 Intercombination
11 Triplet-triplet interaction
12 Label
13 Sensor
14 Main extension plane
15 Axis
16 Scale
17 UV light
18 Roll of a production line
30 Phosphorescence
S0 Singlet state of the phosphor
S1 Excited singlet state of the phosphor
S1' Excited singlet state of oxygen T0 Triplet ground state of oxygen
T1 Excited Triplet state of the phosphor

What is claimed is:

1. A method for activating the phosphorescence of a structure:
    wherein the structure comprises a first and a second material;
    wherein a phosphor is admixed with the first material and oxygen is present in the region of the phosphor; and
    wherein the second material is oxygen-impermeable at a temperature and, in the oxygen-impermeable state, acts as an oxygen barrier between the first material and an environment of the structure;
    the method comprising:
    activating the phosphorescence in a first activation step by irradiating the structure with light of a first characteristic, wherein irradiating the structure with the light of the first characteristic photochemically deactivates the oxygen present in the structure; and
    initiating the phosphorescence by irradiating the structure with light of a second characteristic in a second activation step.

2. The method of claim 1, wherein the structure is partially covered with a mask in the first activation step and/or the structure is only partially illuminated in the first activation step with the light of the first characteristic from a locally meandering or line-by-line scanning light beam and/or the structure is only partially illuminated in the first activation step by illuminating the structure with a light beam having a steel profile.

3. The method of claim 1, wherein in the first activation step the oxygen is bound to a first material in a binding step, wherein prior to the binding step the oxygen is preferably converted from a triplet ground state of the oxygen into an excited singlet state of the oxygen in a triplet-triplet interaction with the phosphor admixed with the first material.

4. The method of claim 3, wherein the phosphor is transferred from a singlet state of the phosphor to an excited singlet state of the phosphor by the light of the first characteristic prior to the Triplet-Triplet interaction, and subsequently from the excited singlet state of the phosphor to an excited triplet state of the phosphor by intercombination, wherein preferably in the second activation step the phosphor is transferred from a singlet state of the phosphor to an excited triplet state of the phosphor.

5. The method of claim 1, wherein a long-chain organic polymer, preferably polymethyl methacrylate, polystyrene and/or cycloolefin copolymers, is used as the first material, wherein the first material preferably has the phosphor as a dopant and/or as a side chain.

6. The method of claim 1, wherein the phosphor used is N,N'-di(1-naphthyl)-N,N'-diphenyl-(1,1'-biphenyl)-4,4'-diamines, tetra-N-phenylbenzidines, PhenDPA, PhenTPA, thianthrenes, benzophenone-thianthrenes, bromo-benzophenone-thianthrenes, benzophenone-2-thianthrenes, diphenylsulfone-thianthrenes, diphenylsulfone-2-thianthrenes, bromo-diphenylsulfone-thianthrenes, difluoroborone-9-hydroxyphenalenones and/or difluoroborone-6-hydroxybenz[de]anthracene-7-one.

7. A method for deactivating the phosphorescence of a structure:
wherein the structure comprises a first and a second material;
wherein a phosphor is admixed with the first material;
wherein the first material is capable of containing molecular oxygen; and
wherein the second material is oxygen-impermeable at an ambient temperature and in the oxygen-impermeable state, acts as an oxygen barrier between the first material and an environment of the structure;
the method comprising:
deactivating the phosphorescence in a deactivation step by heating and/or irradiating the structure with light of a third characteristic, wherein the heating and/or irradiating the structure with the light of the third characteristic introduces oxygen into the structure.

8. The method of claim 7, wherein in the deactivation step the second material is converted from an oxygen impermeable state to an oxygen permeable state by the heat and/or the light of a third characteristic, so that oxygen penetrates to the first material and/or the phosphor, and the oxygen inhibits the phosphorescence.

9. The method of claim 7, wherein IR light is used as light of the third characteristic.

10. The method of claim 7, wherein a long-chain organic polymer, preferably polymethyl methacrylate, polystyrene and/or cycloolefin copolymers, is used as the first material, wherein the first material preferably has the phosphor as a dopant and/or as a side chain.

11. The method of claim 7, wherein the phosphor used is N,N'-di(1-naphthyl)-N,N'-diphenyl-(1,1'-biphenyl)-4,4'-diamines, tetra-N-phenylbenzidines, PhenDPA, PhenTPA, thianthrenes, benzophenone-thianthrenes, bromo-benzophenone-thianthrenes, benzophenone-2-thianthrenes, diphenylsulfone-thianthrenes, diphenylsulfone-2-thianthrenes, bromo-diphenylsulfone-thianthrenes, difluoroborone-9-hydroxyphenalenones and/or difluoroborone-6-hydroxybenz[de]anthracene-7-one.

12. The method of claim 7, wherein the method further comprises reactivation of the phosphorescence in a first activation step by irradiating the structure with light of a first characteristic, wherein irradiating the structure with the light of the first characteristic photochemically deactivates the oxygen present in the structure; and
initiating the phosphorescence by irradiating the structure with light of a second characteristic in a second activation step.

13. A structure comprising a first and a second material, wherein a phosphor is admixed with the first material and oxygen is present in the region of the phosphor in a non-irradiated and/or non-heated state, and wherein the second material is oxygen-impermeable at an ambient temperature and acts as an oxygen barrier between the first material and an environment of the structure in an oxygen-impermeable state.

14. The structure of claim 13, wherein the second material can be converted from the oxygen-impermeable state to an oxygen-permeable state by supplying heat and/or light.

15. The structure of claim 13, wherein the structure comprises a substrate, and wherein the substrate is transparent, comprises a glass plate, or comprises a self-adhesive film.

16. The structure of claim 13, wherein the structure comprises a first layer having a first layer thickness of the first material and/or comprises at least one second layer having a second layer thickness of the second material, wherein the first layer is arranged between the substrate and the at least second layer.

17. The structure of claim 13, wherein the first material is an organic material and/or the second material is an organic material.

18. The structure of claim 13, wherein the first material comprises polymethyl methacrylate, polystyrene and/or cycloolefin copolymers, and wherein the second material comprises ethylene vinyl alcohol copolymers and/or polyvinyl alcohol.

19. A label comprising a functional layer, wherein the functional layer comprises the structure of claim 13.

20. A sensor for determining a dose of ultraviolet light, comprising the structure of claim 13.

* * * * *